US012560914B2

(12) United States Patent
Sasaki et al.

(10) Patent No.: US 12,560,914 B2
(45) Date of Patent: Feb. 24, 2026

(54) AUTOMATIC INSPECTION SYSTEM AND WIRELESS SLAVE DEVICE

(71) Applicant: Hitachi, Ltd., Tokyo (JP)

(72) Inventors: Reiso Sasaki, Tokyo (JP); Kazuo Ono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 401 days.

(21) Appl. No.: 17/921,408

(22) PCT Filed: Jun. 15, 2020

(86) PCT No.: PCT/JP2020/023381
§ 371 (c)(1),
(2) Date: Oct. 26, 2022

(87) PCT Pub. No.: WO2021/255783
PCT Pub. Date: Dec. 23, 2021

(65) Prior Publication Data
US 2023/0161334 A1     May 25, 2023

(51) Int. Cl.
G05B 19/418 (2006.01)
G01K 1/024 (2021.01)
H04W 52/02 (2009.01)

(52) U.S. Cl.
CPC ....... G05B 19/41865 (2013.01); G01K 1/024 (2013.01); H04W 52/0251 (2013.01); G05B 2219/50185 (2013.01)

(58) Field of Classification Search
None
See application file for complete search history.

(56) References Cited

U.S. PATENT DOCUMENTS 6,507,790 B1 * 1/2003 Radomski .............. G01H 1/003
702/42
10,031,490 B2 * 7/2018 Nixon ................. G06F 3/04817
(Continued)

FOREIGN PATENT DOCUMENTS

JP       2005-188824 A      7/2005
JP       2009-273113 A      11/2009
(Continued)

OTHER PUBLICATIONS

International Search Report of PCT/JP2020/023381 dated Aug. 11, 2020.

*Primary Examiner* — Hua Lu
(74) *Attorney, Agent, or Firm* — MATTINGLY & MALUR, PC

(57) ABSTRACT
An automatic inspection system includes a wireless slave device and a wireless master device. The wireless slave device includes a sound collection unit that collects sound generated from an inspection target object, an analysis unit that analyzes the collected sound to obtain a degree of difference between the collected sound and normal sound learned in advance and sound state information of the collected sound, as an analysis result, a wireless communication unit that wirelessly transmits data including the analysis results to a wireless master device, and a power supply unit that supplies power to the sound collection unit, the analysis unit, and the wireless communication unit. The wireless master device is configured to perform processing of receiving and managing the data from the wireless slave device, and transmitting the analysis result extracted from the data to a monitoring terminal that monitors a state of the inspection target object.

13 Claims, 14 Drawing Sheets

(56)             References Cited

U.S. PATENT DOCUMENTS

| | | | | |
|---|---|---|---|---|
| 2005/0050423 | A1* | 3/2005 | Yasukawa | B41J 29/38 |
| | | | | 714/742 |
| 2005/0114081 | A1* | 5/2005 | Fukui | G01N 29/4445 |
| | | | | 702/182 |
| 2005/0262394 | A1* | 11/2005 | Yasukawa | G06F 11/0748 |
| | | | | 714/E11.026 |
| 2005/0262995 | A1* | 12/2005 | Kilkis | F41H 11/12 |
| | | | | 89/1.13 |
| 2008/0304672 | A1* | 12/2008 | Yoshizawa | G10L 21/028 |
| | | | | 704/E15.001 |
| 2014/0333447 | A1* | 11/2014 | Fang | B29C 45/768 |
| | | | | 340/679 |
| 2015/0043737 | A1* | 2/2015 | Abe | G10L 25/48 |
| | | | | 381/56 |
| 2015/0241871 | A1* | 8/2015 | Yoshino | G05B 19/0423 |
| | | | | 702/81 |
| 2017/0034827 | A1* | 2/2017 | Naiki | H04L 67/12 |
| 2017/0115256 | A1* | 4/2017 | Chantz | G01N 29/46 |
| 2017/0195823 | A1* | 7/2017 | Shinohara | H04W 4/70 |
| 2017/0332279 | A1* | 11/2017 | Kobayashi | H04L 47/805 |
| 2019/0064768 | A1* | 2/2019 | Tanaka | G05B 19/4065 |
| 2019/0086903 | A1* | 3/2019 | Ochiai | G05B 19/41865 |
| 2019/0179297 | A1* | 6/2019 | Kuroda | G06N 20/00 |
| 2019/0242728 | A1* | 8/2019 | Low | G01B 11/24 |
| 2019/0243351 | A1* | 8/2019 | Okita | G05B 23/0275 |
| 2020/0073367 | A1* | 3/2020 | Nguyen | G06F 16/683 |
| 2020/0254615 | A1* | 8/2020 | Bryner | B25J 5/007 |
| 2021/0241784 | A1 | 8/2021 | Sasaki et al. | |
| 2021/0255613 | A1* | 8/2021 | Mizobuchi | G01H 17/00 |
| 2021/0335064 | A1* | 10/2021 | Kim | G07C 5/0833 |
| 2022/0083032 | A1* | 3/2022 | Kim | G05B 19/41865 |

FOREIGN PATENT DOCUMENTS

| | | | |
|---|---|---|---|
| JP | 2013-243485 | A | 12/2013 |
| JP | 2014-096050 | A | 5/2014 |
| JP | 2014-207574 | A | 10/2014 |
| JP | 2017-032275 | A | 2/2017 |
| JP | 2018-022371 | A | 2/2018 |
| JP | 2018-088179 | A | 6/2018 |
| JP | 2020-046771 | A | 3/2020 |

* cited by examiner

D1

| HEADER | ABNORMALITY DEGREE (AVERAGE VALUE, STANDARD DEVIATION) | SOUND STATE INFORMATION |
|--------|-------------------------------------------------------|-------------------------|

DATA SECTION

L1 ⁝ D1

30

WIRELESS MASTER DEVICE

31

WIRELESS COMMUNICATION UNIT

32

DATA STORAGE UNIT

ABNORMALITY DEGREE — 321

ABNORMALITY CAUSE — 322

SOUND STATE INFORMATION — 323

OTHER INFORMATION — 324

33

DATA DISCLOSURE UNIT

L2

40

MONITORING TERMINAL

ABNORMALITY DEGREE TREND — 41     ABNORMALITY CAUSE — 42

60

AUTOMATIC INSPECTION SYSTEM AND WIRELESS SLAVE DEVICE

TECHNICAL FIELD

The present invention relates to an automatic inspection system and a wireless slave device for inspecting a facility such as a plant.

BACKGROUND ART

In sites such as a power plant, a chemical plant, and a steel plant, facilities such as a motor, a compressor, and a turbine are installed. When components such as bearings and insulators deteriorate due to aging of the facilities, an abnormal sound is generated. Conventionally, an operation in which a worker hears an operation sound of a facility to determine whether the facility is normal has been performed. However, in order for a worker to distinguish abnormal sounds, it is necessary to have many years of experience. Furthermore, since the worker walks around a wide site and inspects the facilities with his/her own ears, a load on the worker is large. In recent years, the aging of skilled workers who can distinguish abnormal sounds has progressed, and it is also difficult to secure new workers.

Therefore, a technique disclosed in PTL 1 is known as a technique for monitoring a monitoring target object. A monitoring device disclosed in PTL 1 incorporates a radio device and an antenna connected to the radio device. The radio device transmits acoustic data and image data processed by an information processor and receives control signals of a microphone and a camera.

CITATION LIST

Patent Literature

PTL 1: JP 2009-273113 A

SUMMARY OF INVENTION

Technical Problem

A conventional monitoring device disclosed in PTL 1 wirelessly transmits acoustic data of a monitoring target object to a monitoring processing device at a place away from the monitoring target object. Then, the monitoring processing device can calculate a frequency spectrum from the acoustic data collected by the monitoring device and detect an occurrence of an abnormality in a monitoring target facility by a neural network model. The data size of the acoustic data transmitted from the monitoring device is large although the data size varies depending on the frequency of the sound generated by the measurement target and the like. Therefore, the processing of measuring and analyzing the acoustic data, which is performed by the monitoring processing device becomes heavy, and the power consumption in the monitoring processing device tends to increase.

In addition, in a case where a sensor device is installed, in a so-called retrofitting manner, in an on-site facility of the plant, there is not always an outlet near the facility, and it is difficult to obtain a wired power supply capable of supplying power to the sensor device. Therefore, the sensor device needs to operate a built-in battery as a power source. However, when the sensor device performs processing with high power consumption (for example, processing of transmitting acoustic data having a large data size), the built-in battery runs out immediately, the frequency of battery replacement increases, and the usability of the sensor device deteriorates.

The present invention has been made in view of the above circumstances, and an object of the present invention is to reduce power consumption of a sensor device that collects sound generated by an inspection target object.

Solution to Problem

In order to solve the above problems, according to an aspect of the present invention, an automatic inspection system includes a wireless slave device and a wireless master device.

The wireless slave device is configured to include a sound collection unit that collects sound generated from an inspection target object, an analysis unit that analyzes the collected sound to obtain a degree of difference between the collected sound and normal sound learned in advance and sound state information of the collected sound, as an analysis result, a wireless communication unit that wirelessly transmits data including the analysis results to a wireless master device, and a power supply unit that supplies power to the sound collection unit, the analysis unit, and the wireless communication unit.

The wireless master device is configured to perform processing of receiving and managing the data from the wireless slave device, and transmitting the analysis result extracted from the data to a monitoring terminal that monitors a state of the inspection target object.

Advantageous Effects of Invention

According to at least an aspect of the present invention, the wireless slave device does not transmit data in all frequency bands of sound collected from an inspection target object, as an analysis result, but transmits the degree of difference from the normal sound and the sound state information of the collected sound to the wireless master device as the analysis result. Therefore, it is possible to reduce the data size of the data transmitted from the wireless slave device to the wireless master device, and reduce the power consumption of the wireless slave device.

Objects, configurations, and advantageous effects other than those described above will be clarified by the descriptions of the following embodiments.

DESCRIPTION OF EMBODIMENTS

Hereinafter, embodiments for embodying the present invention will be described with reference to the accompanying drawings. In the present specification and the attached drawings, components having substantially the same functions or configurations are designated by the same reference signs, and repetitive description will be omitted.

In an automatic inspection system according to each embodiment described below, data obtained by collecting sound (operating sound) generated in an on-site facility such as a plant is analyzed, and a degree of difference between sound data and normal sound, and sound state information of the collected sound are transmitted to a wireless master device as an analysis result.

First Embodiment

First, a configuration example and an operation example of an automatic inspection system according to a first embodiment will be described with reference to FIGS. 1 to 14.

[Overall Configuration of Automatic Inspection System]

Figure 1:
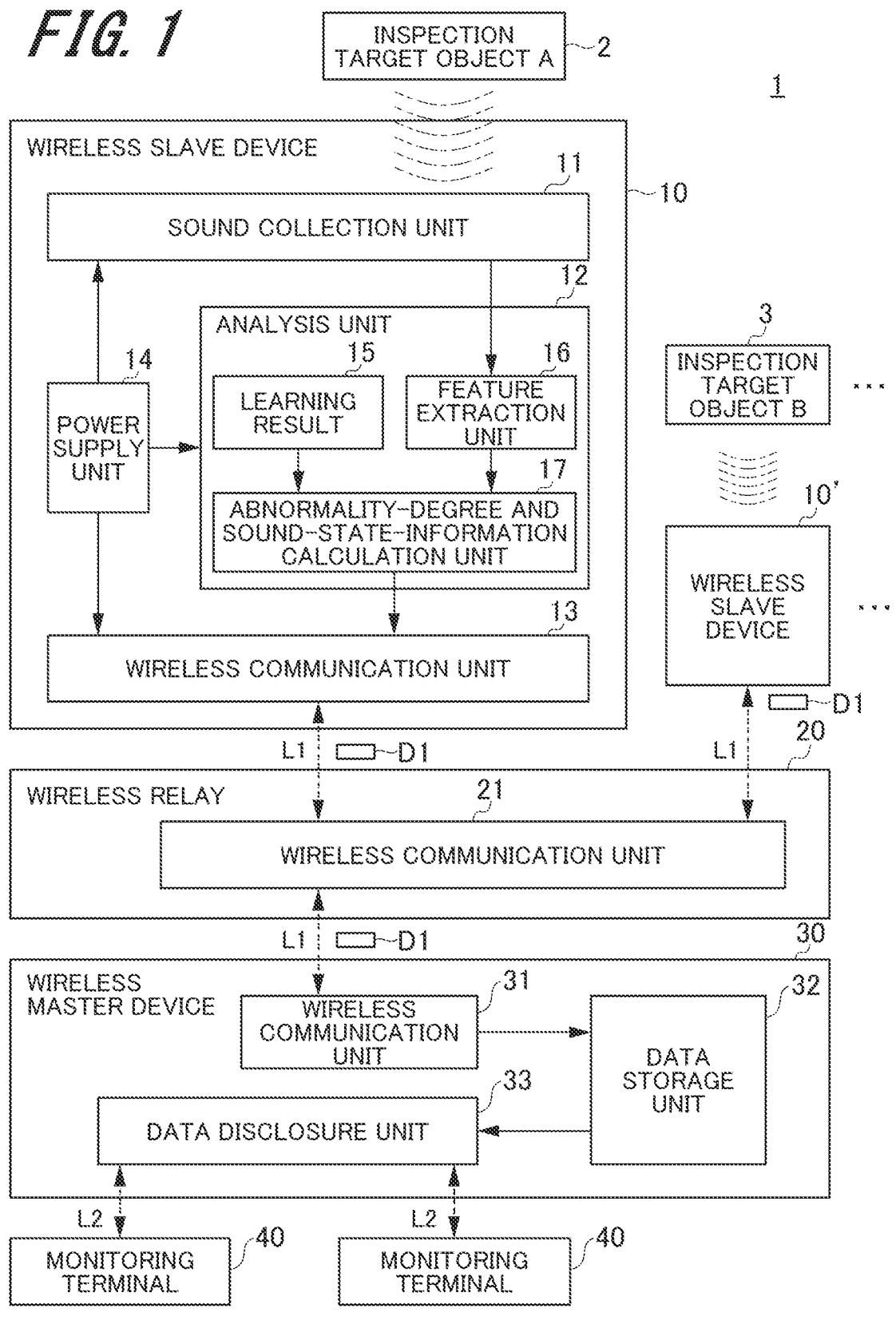
FIG. 1 is a block diagram illustrating an overall configuration example of an automatic inspection system according to a first embodiment of the present invention.

FIG. 1 is a block diagram illustrating an overall configuration example of an automatic inspection system 1 according to a first embodiment. The automatic inspection system 1 is applied to, for example, a plant such as a power plant, a chemical plant, a steel plant, or a substation, or a building such as a building. The automatic inspection system 1 includes wireless slave devices 10 and 10', a wireless relay 20, a wireless master device 30, and a monitoring terminal 40. Various types of data can be transmitted and received between the wireless slave devices 10 and 10' and the wireless relay 20 and between the wireless relay 20 and the wireless master device 30, via a wireless communication path L1. Various types of data can be transmitted and received between the wireless master device 30 and the monitoring terminal 40 via a wireless communication path L2. Various types of data may be able to be transmitted and received between the wireless master device 30 and the monitoring terminal 40 via a wired communication path.

The plant is provided with facilities for generating sound, such as a motor, a pump, a compressor, a turbine, and a boiler. At least a portion of the facility that is provided in the plant and generates sound serves as a monitoring target (inspection target) by the automatic inspection system 1. In the following description, a facility as a monitoring target is referred to as an "inspection target object". A wireless slave device 10 (an example of a slave device) is provided near an inspection target object A2. The wireless slave device 10 may be provided in contact with the inspection target object A2 or may be provided away from the inspection target object A2. In addition, a configuration in which different wireless slave devices 10 and 10' are provided for different inspection target objects A2 and B3, respectively, and the inspection target objects A2 and B3 are monitored by the respective wireless slave devices 10 and 10' may be made. In addition, a configuration in which the wireless slave device 10 and the wireless slave device 10' may be provided for one inspection target object A2, and different parts of the inspection target object A2 are monitored by the wireless slave device 10 and the wireless slave device 10', respectively may be made. The wireless slave device 10 will be described below.

[Wireless Slave Device]

The wireless slave device 10 is used as a "sound sensor device" that collects sound generated from the inspection target object A2 and detects features of the sound. Therefore, the wireless slave device 10 collects the sound generated from the inspection target object A2, analyzes the collected sound to obtain the degree of difference between the sound data and the normal sound as an analysis result, and transmits data including the analysis result to the wireless master device 30. Here, the amplitude of the sound is a displacement based on a silent state. The data including the analysis result is a packet D1 having the detailed configuration illustrated in FIG. 2 to be described later. In the following description, the data including the analysis result is referred to as the packet D1.

The wireless slave device 10 includes, for example, a sound collection unit 11, an analysis unit 12, a wireless communication unit 13, and a power supply unit 14. Each unit provided in the wireless slave device 10 is stored in a housing having a waterproof and dustproof function. Here, the wireless slave device 10 will be described as a device in which a sensor function and a wireless communication function are integrated. A device in which a sensor function unit (sound collection unit 11 and analysis unit 12) and a wireless communication function unit (wireless communication unit 13) which are configured separately are connected via a signal line may be handled as the wireless slave device 10.

The sound collection unit 11 includes an analog-to-digital (AD) conversion unit (not illustrated) in the sound collection unit 11. The AD conversion unit in the sound collection unit 11 samples and quantizes the amplitude of an analog signal of sound collected from the inspection target object A2 at the predetermined interval (for example, every 10 minutes or every 1 hour), converts the analog signal into a digital value, and outputs the digital value to the analysis unit 12.

The analysis unit 12 analyzes the digital value of the sound input from the sound collection unit 11, and obtains the degree of difference between the collected sound and the normal sound learned in advance, and sound state information of the collected sound as an analysis result. The analysis unit 12 transmits the analysis result to the wireless communication unit 13. The analysis unit 12 includes a learning result 15, a feature extraction unit 16, and an abnormality-degree and sound-state-information calculation unit 17.

The learning result 15 is data of the normal sound learned in advance by a learning result setting terminal 7 illustrated in FIG. 9 to be described later, and is information in which the sound of the inspection target object A2 that normally operates is learned. The learning result 15 indicates a feature or the like obtained in a manner that the intensity of an electrical signal obtained by converting the normal sound by the sound collection unit 11 is calculated for each frequency based on recording information recorded in advance by the learning result setting terminal 7, and the autocorrelation is obtained for each predetermined time. The learning result 15 is registered in advance in the wireless slave device 10 by the learning result setting terminal 7, for example, when the wireless slave device 10 is installed.

The feature extraction unit 16 extracts a feature of the electric signal based on the electric signal input from the sound collection unit 11. That is, the feature extraction unit 16 can extract the feature of sound generated by the inspection target object A2 from the sound collected by the sound collection unit 11. The feature of the sound contained in the learning result 15 or extracted by the feature extraction unit 16 is a parameter characterizing the sound generated for each inspection target object A2. For example, in a predetermined period, the frequency (high and low) of sound included in an audible area can be exemplified as the feature.

The abnormality-degree and sound-state-information calculation unit 17 calculates the degree of difference between the feature extracted by the feature extraction unit 16 from the sound collected by the sound collection unit 11, and the learning result 15 of the normal sound. An example of a method of calculating the degree of difference will be described. First, the abnormality-degree and sound-state-information calculation unit 17 randomly samples a plurality of features of the sound indicated by the learning result 15 and a plurality of features of the sound collected by the sound collection unit 11. Then, the abnormality-degree and sound-state-information calculation unit 17 individually inputs sets of sampled features to the Gaussian mixture model or the like, and calculates a score for each set. Then, the abnormality-degree and sound-state-information calculation unit 17 obtains a difference between the calculated scores to obtain the degree of difference (also referred to as an "abnormality degree" below) between the feature extracted by the feature extraction unit 16 and the learning result 15 of the normal sound. Information (information regarding the state of the sound) that has an influence on the degree of difference at this time is "sound state information". For example, the sound state information indicates at least one of the frequency band of the collected sound and the magnitude (intensity) of the output for each frequency.

The abnormality-degree and sound-state-information calculation unit 17 can calculate statistical information (see FIG. 8 described later) such as an average of the abnormality degree and standard deviation of the abnormality degree by repeating the above processes a plurality of times. In addition, the abnormality-degree and sound-state-information calculation unit 17 repeats the above processes to calculate the sound state information of the sound collected by the sound collection unit 11 based on the feature extracted by the feature extraction unit 16 from the sound collected by the sound collection unit.

The wireless communication unit 13 wirelessly transmits the packet D1 in which destination information of the wireless master device 30 is added to the analysis result obtained by the analysis unit 12, to the wireless master device 30 via the wireless relay 20 at a predetermined timing. This process is performed in a manner that the wireless communication unit 13 communicates with a wireless communication unit 21 of the wireless relay 20. The packet D1 including the analysis result is transmitted to the wireless relay 20 as indicated by the wireless communication path L1, and is further transmitted from the wireless relay 20 to the wireless master device 30.

The power supply unit 14 supplies power stored in a built-in battery 58 (see FIG. 4 described later) incorporated in the wireless slave device 10 to operate the sound collection unit 11, the analysis unit 12, and the wireless communication unit 13. It is assumed that the type of built-in battery 58 is not limited. Note that the wireless slave device 10 may be provided with a power generation unit (not illustrated) that feeds the generated power to the power supply unit 14.

[Wireless Relay]

The wireless relay 20 constitutes a portion of a sensor network stretched around the plant, and can transfer the packet D1 transmitted from the wireless slave devices 10 and 10' to the wireless master device 30 as described above.

The portion of the sensor network may include a sound sensor network capable of detecting abnormal sound generated from inspection target objects A2 and B3 and diagnosing the states of the inspection target objects A2 and B3. In this case, in addition to the sound sensor network, the sensor network may include a sensor network capable of detecting at least one or more types of information of the temperature, the humidity, the pressure, the voltage value, the current value, the frequency, the resistance value, the flow rate, the flow velocity, the color, the image, and the like. Alternatively, all of the sensor networks provided in the plant may be constituted by the sound sensor network.

The wireless relay 20 can receive the packet D1 wirelessly transmitted from one wireless slave device 10 or a plurality of wireless slave devices 10 and 10', and then wirelessly transmit the packet D1 to the wireless master device 30. In addition, the wireless relay 20 can transfer the respective packets D1 received from the plurality of wireless slave devices 10 and 10' to the wireless master device 30. Specifically, the wireless relay 20 can wirelessly communicate with the plurality of wireless slave devices 10 and 10' and transmit the packet D1 received from each of the wireless slave devices 10 and 10' to the wireless master device 30. Here, the wireless master device 30 issues an instruction of a transmission order of the packet D1 to the plurality of wireless slave devices 10 and 10', and wirelessly receives the data received from the wireless slave devices 10 and 10' by the wireless relay 20, via the wireless relay 20 according to the transmission order.

For example, the wireless master device 30 instructs the plurality of wireless slave devices 10 and 10' sequentially selected by a polling method, to transmit the packet D1 via the wireless relay 20. The wireless slave devices 10 and 10' having received the instruction from the wireless master device 30 sequentially transmit the packet D1 to the wireless relay 20. Then, the wireless relay 20 sequentially transmits the packets D1 received from the wireless slave devices 10 and 10' to the wireless master device 30 in the instructed transmission order. Therefore, the wireless master device 30 can receive the packet D1 while avoiding collision between the packets D1 transmitted from the plurality of wireless slave devices 10 and 10' via the wireless relay 20.

Figure 12:
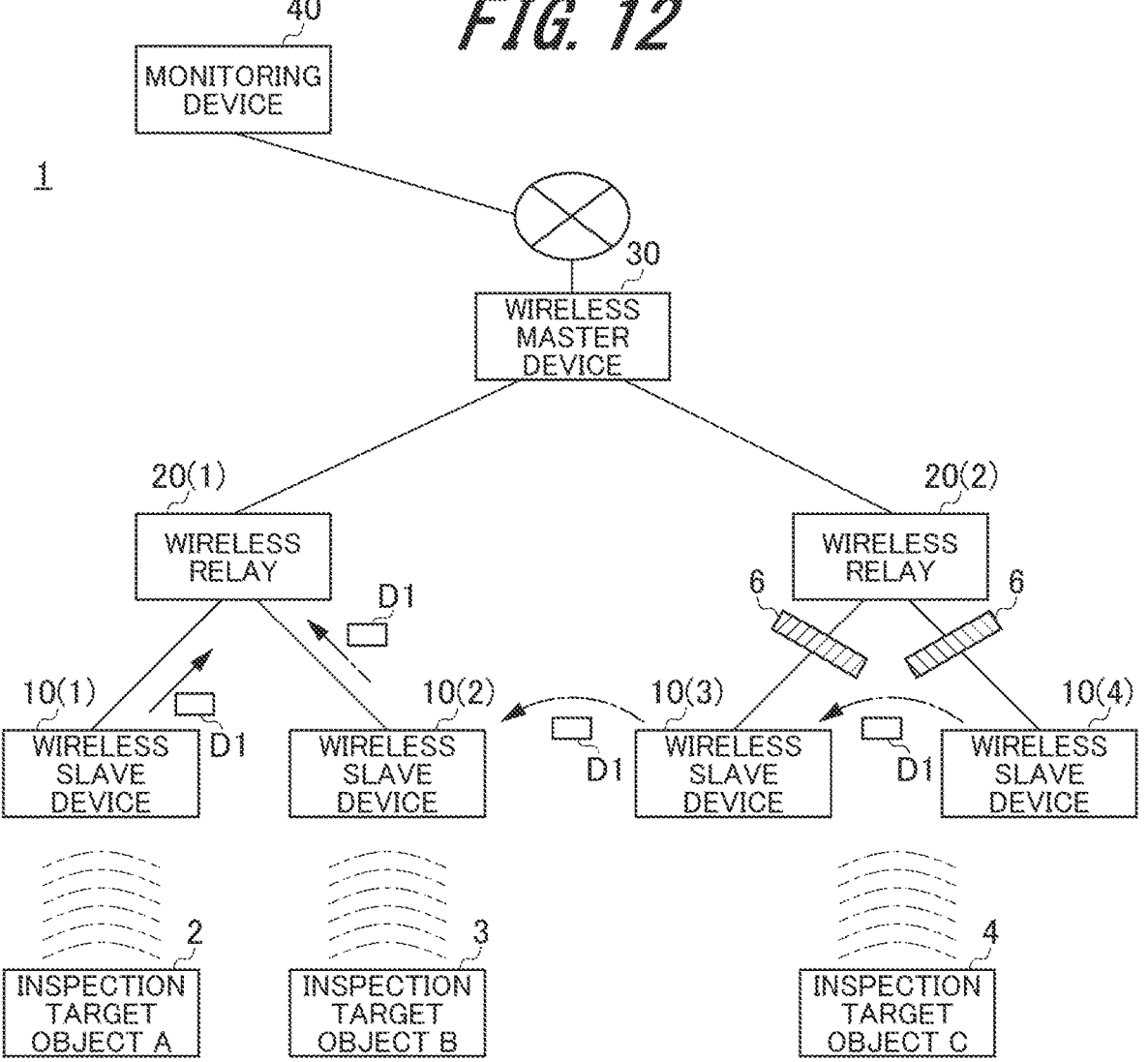
FIG. 12 is a diagram illustrating a first configuration example (single manager) of a multi-hop network of the automatic inspection system according to the first embodiment of the present invention.
Figure 13:
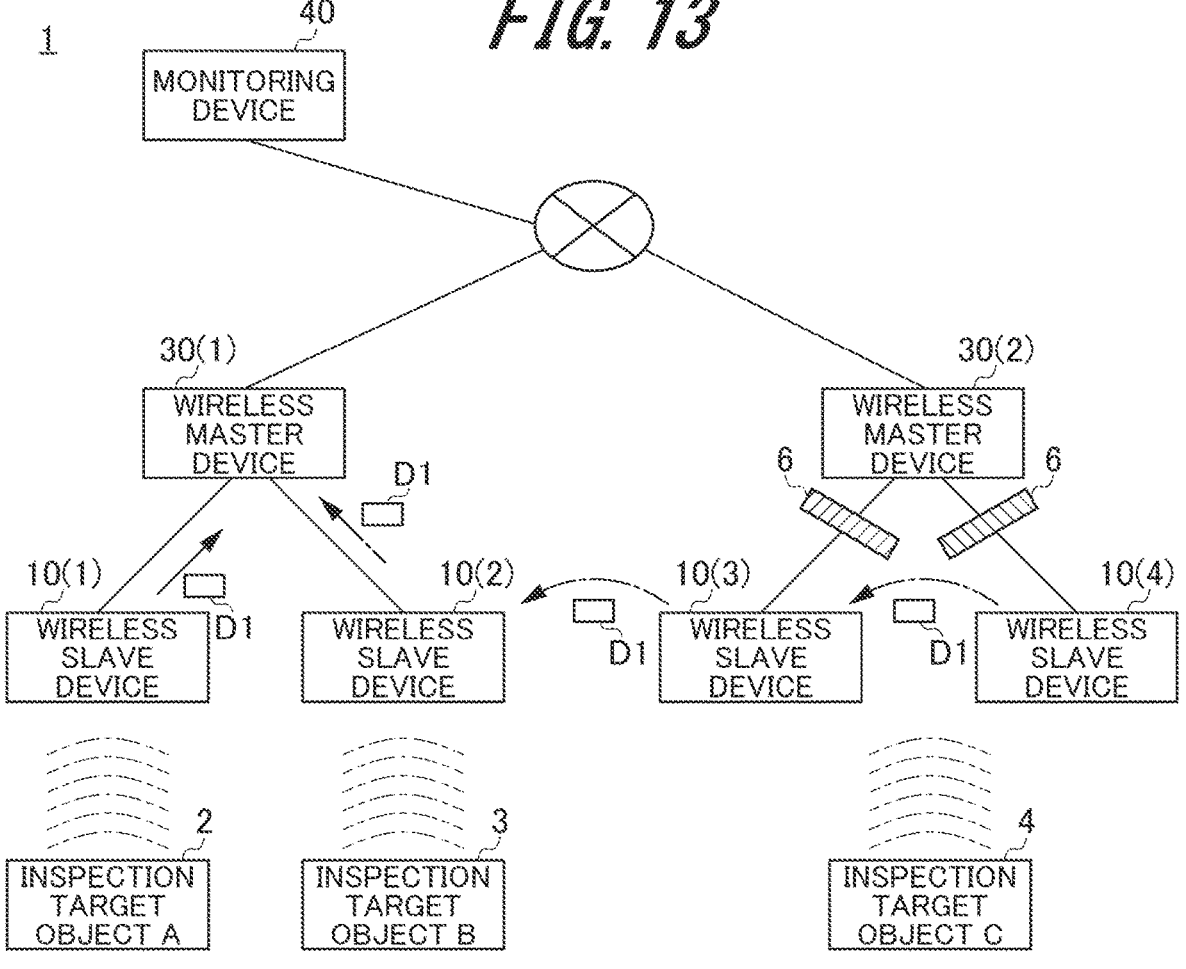
FIG. 13 is a diagram illustrating a second configuration example (multi-manager) of the multi-hop network of the automatic inspection system according to the first embodiment of the present invention.
Figure 14:
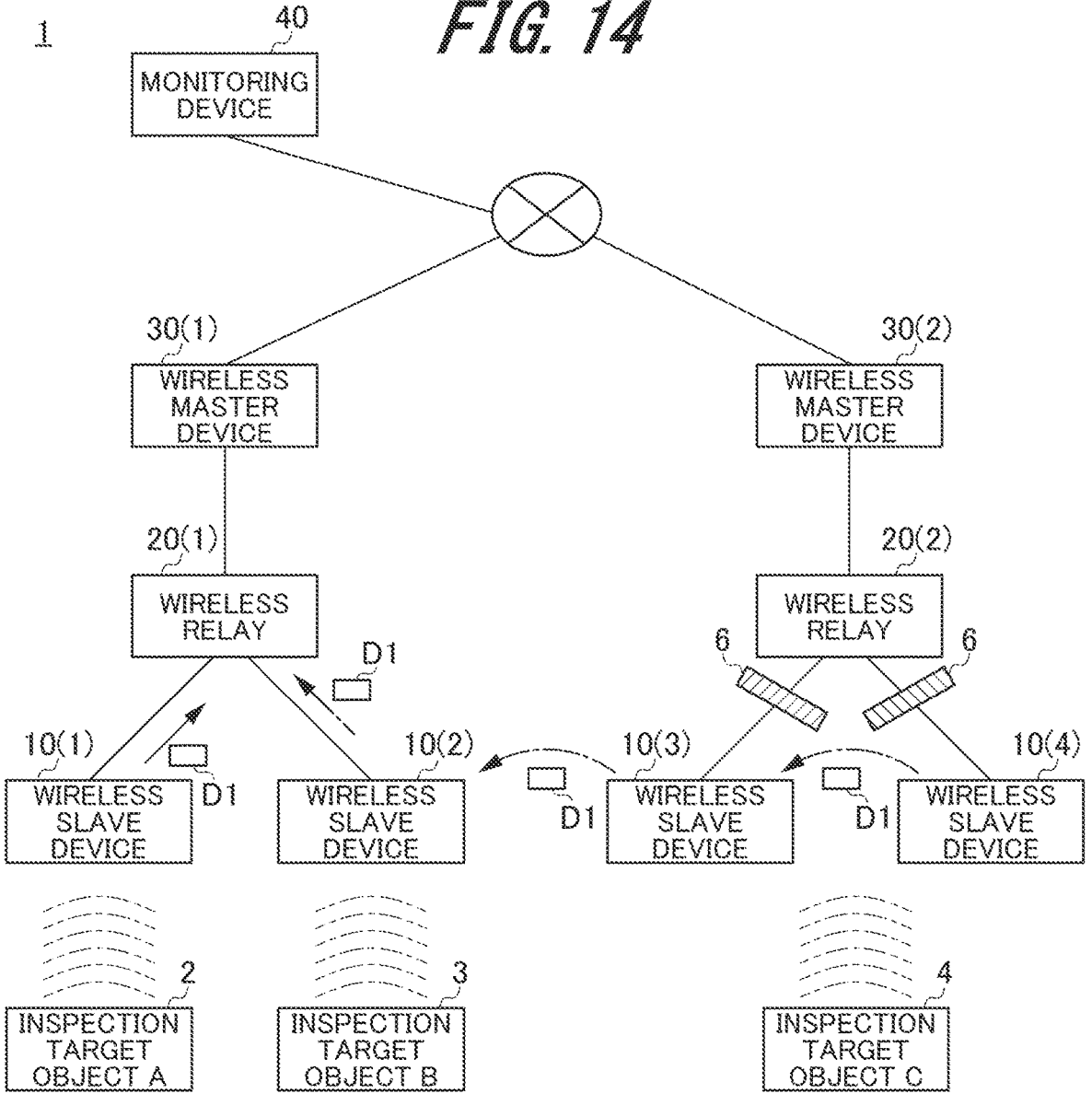
FIG. 14 is a diagram illustrating a third configuration example (multi-manager) of the multi-hop network of the automatic inspection system according to the first embodiment of the present invention.

Note that, as illustrated in FIGS. 12 to 14 to be described later, between a plurality of wireless slave devices 10 and 10' close to each other, the wireless slave devices 10 and 10' can transfer the packet D1 to the wireless relay 20 by a so-called bucket relay method (multi-hop routing). At this time, the wireless slave device 10(3) (see FIGS. 12 to 14) that performs bucket relay of the packet D1 functions as the wireless relay that relays the packet D1.

Although FIG. 1 illustrates an example in which only one wireless relay 20 is provided, a plurality of wireless relays 20 may be provided. Further, the wireless communication path L1 may not include the wireless relay 20. In this case, the wireless slave device 10 can wirelessly and directly communicate with the wireless master device 30.

[Wireless Master Device]

The wireless master device 30 manages data (packet D1) received from the wireless slave device 10 via the wireless relay 20. Therefore, for example, the wireless master device 30 has a function of interpreting the content of the packet D1 (for example, referred to as a data parsing function) and storing the content as a file. The contents of the data described in this file may be obtained by converting the analysis result transmitted from the wireless slave device 10 into text, or may be obtained by converting bits or byte information of the packet into text as it is. As the format of the file, various types such as tab delimiter, space delimiter, and comma delimiter may be considered, and may be freely designed by a worker.

The wireless master device 30 transmits the analysis result (including the abnormality cause if there is an abnormality) extracted from the data to the monitoring terminal 40 based on a request from the monitoring terminal 40 that monitors the states of the inspection target objects A2 and B3. Therefore, the wireless master device 30 retains the analysis result received from the wireless slave device 10. The wireless master device 30 detects, for example, a state change of the inspection target objects A2 and B3 deteriorated over time, based on the degree of difference between the feature of the sound collected by the sound collection unit 11 and the learning result 15 of the normal sound. The feature is represented by the average value of the abnormality degrees of the inspection target objects A2 and B3 and the standard deviation of the abnormality degrees, which are obtained from the analysis result. Then, the wireless master device 30 notifies the monitoring terminal 40 of a probability of the abnormality in the inspection target objects A2 and B3 (including the abnormality cause if there is an abnormality) based on the detected state change of the inspection target objects A2 and B3. The wireless master device 30 includes a wireless communication unit 31, a data storage unit 32, and a data disclosure unit 33.

The wireless communication unit 31 communicates with the wireless relay 20.

The data storage unit 32 extracts data including an analysis result from the packet D1 received from the wireless slave device 10, and stores the data in association with the time when the wireless master device 30 collects the packet D1. As a result, the data storage unit 32 converts the data extracted from the packet D1 into time-series data. In a case where the data storage unit 32 does not have a storage capacity capable of retaining all pieces of the time-series data, a configuration in which the data to be retained is transferred to an external information processing apparatus or an information storage device to retain all pieces of the information in the entire system may be made.

The data disclosure unit 33 provides the monitoring terminal 40 with the time-series data retained by the data storage unit 32 and the probability of the abnormality in the inspection target objects A2 and B3 (including the abnormality cause if there is abnormality) in response to a request from the monitoring terminal 40.

[Monitoring Terminal]

The monitoring terminal 40 is used by a worker to monitor the states of the inspection target objects A2 and B3 through the wireless master device 30. The monitoring terminal 40 performs a process of determining and disclosing the states of the inspection target objects A2 and B3 by using the analysis result (including the abnormality cause if there is an abnormality) received from the wireless master device 30.

[Configuration of Packet]

Figures 2, 3:
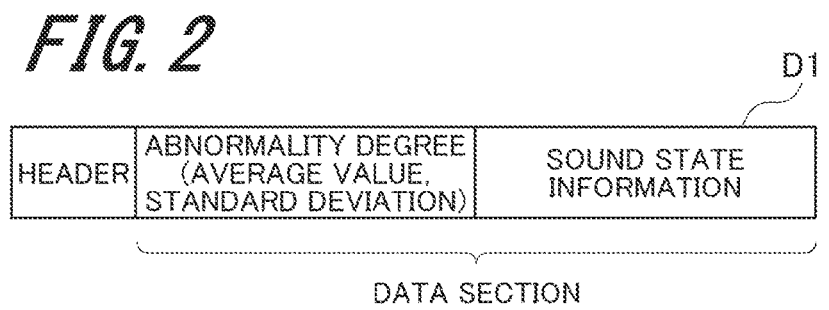
FIG. 2 is a diagram illustrating a configuration example of a packet including an analysis result according to the first embodiment of the present invention.
FIG. 3 is a block diagram illustrating an internal configuration example of a wireless master device and a monitoring terminal according to the first embodiment of the present invention.

FIG. 2 illustrates a configuration example of the packet D1 including the analysis result.

The packet D1 includes a header and a data section. In the data section, data representing the abnormality degree and data representing sound state information are stored as the analysis result. The data representing the abnormality degree includes the average value of the abnormality degree and the value of the standard deviation of the abnormality degree.

The header includes a network address (for example, an IP address) for specifying the wireless master device 30 at which the packet D1 finally arrives, or destination information represented by identification information of the wireless master device 30 or the like.

The average value of the abnormality degree is a value obtained by averaging the abnormality degree calculated for each predetermined timing by the abnormality-degree and sound-state-information calculation unit 17 in a unit time.

The standard deviation of the abnormality degree is a value of the standard deviation calculated by the abnormality-degree and sound-state-information calculation unit 17 based on the average value of the abnormality degree.

[System of Wireless Master Device and Monitoring Terminal]

Next, the system of the wireless master device 30 and the monitoring terminal 40 will be described with reference to FIG. 3.

FIG. 3 is a diagram illustrating the system of the wireless master device 30 and the monitoring terminal 40. The data storage unit 32 of the wireless master device 30 stores an abnormality degree 321, an abnormality cause 322, sound state information 323, and other information 324.

The wireless master device 30 stores the time-series data including the abnormality degree 321 and the sound state information 323 received by the wireless communication unit 31 in the data storage unit 32. The data storage unit 32 is configured to associate the sound state information 323 with the abnormality cause 322 so that the worker can quickly specify the abnormality cause when the abnormality occurs. As an association method, for example, in an event in which a difference from the normal time appears in a specific frequency band such as bearing deterioration of a motor, the specific frequency band is associated with bearing deterioration (abnormality cause 322) in advance as the sound state information 323. In addition, regarding an unknown abnormality in advance, the sound state information 323 of the sound obtained when the abnormality occurs, and the abnormality cause 322 at this time are stored in the data storage unit 32 in association with each other, and thus it is possible to immediately handle a similar abnormality occurrence. As an example, the association between the sound state information 323 and the abnormality cause 322 is performed by a manual input using an input device (not illustrated) such as a mouse or a keyboard included in a computer 60 of the wireless master device 30 or the monitoring terminal 40.

The other information 324 is more detailed sound state information at the time of abnormality or when abnormality is suspected. The other information 324 is, for example, information for each frequency of sound data, such as the frequency with the highest intensity for the sound data collected by the wireless slave device 10 or how much the intensity of which frequency has changed. As a specific example, the other information 324 is power spectrum information around the frequency band in which the occurrence of the abnormality is detected in the sound data. In the wireless master device 30, for example, in a case where the data disclosure unit 33 determines that it is necessary to determine the abnormality cause (the abnormality degree is equal to or greater than a threshold value, or the like), or in accordance with an instruction from the worker via the monitoring terminal 40, the wireless slave device 10 is requested to provide more detailed information of the corresponding portion (information (power spectrum or the like) regarding a frequency band having a high abnormality degree or the periphery). Then, the wireless master device 30 stores the information acquired from the wireless slave device 10 in the data storage unit 32 as the other information 324.

The monitoring terminal 40 outputs a graph display or the like of time-series data to a display, a printer, or the like as a monitoring result of the states of the inspection target objects A2 and B3. The monitoring terminal 40 may have a function of performing data analysis processing such as clustering processing on the time-series data retained by the data storage unit 32 of the wireless master device 30. As a result, the monitoring terminal 40 can also analyze an abnormality degree trend 41 (fluctuation pattern) of the abnormality degree 321 and the abnormality cause 42 (abnormality cause 322) when an abnormality is detected, for each inspection target object.

[Hardware Configuration of Each Device]

Next, a hardware configuration example of the computers 50 and 60 constituting the respective devices in the automatic inspection system 1 will be described with reference to FIGS. 4 and 5.

Figure 4:
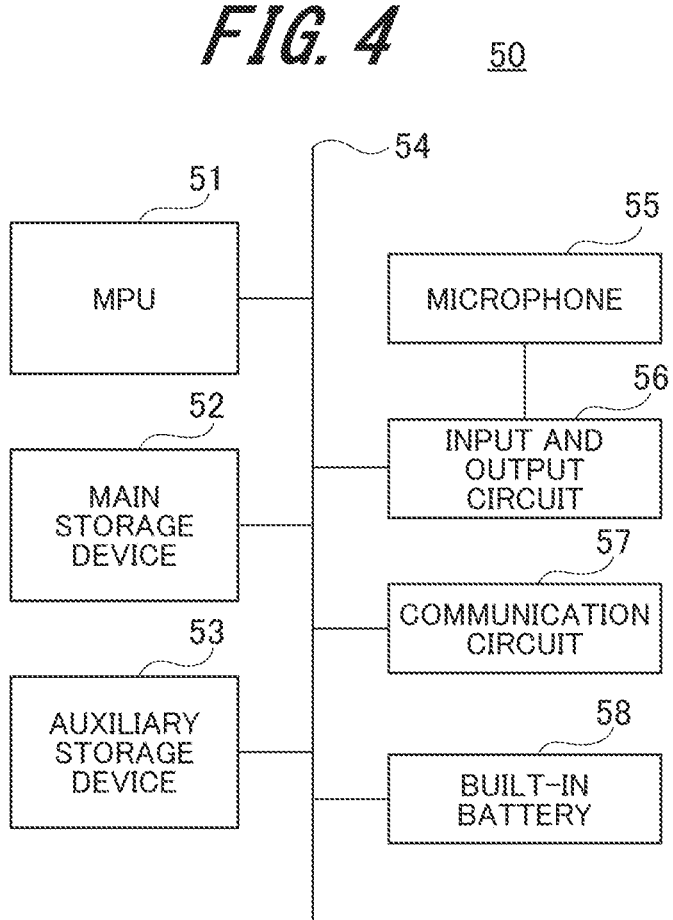
FIG. 4 is a block diagram illustrating a hardware configuration example of a computer constituting a wireless slave device according to the first embodiment of the present invention.

FIG. 4 is a block diagram illustrating a hardware configuration example of the computer 50 constituting the wireless slave device 10. Note that a hardware configuration example of the computer 50 constituting the wireless slave device 10' is similar to that of the wireless slave device 10. Thus, in the following description, a hardware configuration example of the computer 50 constituting the wireless slave device 10 will be described focusing on the wireless slave device 10.

The computer 50 is hardware used as a computer used in the wireless slave device 10. The computer 50 includes a micro processing unit (MPU) 51, a main storage device 52, an auxiliary storage device 53, and a bus 54. The computer 50 further includes a microphone 55, an input and output circuit 56, a communication circuit 57, and a built-in battery 58. The blocks are communicably connected to each other via a bus 54.

The MPU 51 reads program codes of software for realizing each function of the wireless slave device 10 according to the present embodiment from the auxiliary storage device 53, loads the program codes into the main storage device 52, and executes the program codes. Therefore, in addition to a boot program and various parameters, a program for causing the computer 50 to function is recorded in the auxiliary storage device 53. The auxiliary storage device 53 permanently records a program, data, and the like necessary for the MPU 51 to operate, and is used as an example of a computer-readable non-transitory recording medium storing a program executed by the computer 50. As the auxiliary storage device 53, a non-volatile memory including a semiconductor memory or the like is used.

Variables, parameters, and the like generated in the middle of arithmetic processing of the MPU 51 are temporarily written in the main storage device 52, and the variables, the parameters, and the like are appropriately read by the MPU 51. In the wireless slave device 10, the function of each unit in the wireless slave device 10 is realized by the MPU 51 executing a program. Furthermore, in the wireless slave device 10, a digital value received from the sound collection unit 11 (microphone 55) is temporarily stored in the auxiliary storage device 53, and the analysis result of the analysis unit 12 is also temporarily stored in the auxiliary storage device 53.

The microphone 55 is a device that collects sound generated by the inspection target object A2 and outputs a digital value of the sound. Here, it is known that sound in an ultrasonic area higher than an audible area is generated when an abnormality starts to occur in the inspection target object A2. Therefore, the microphone 55 may have a function capable of collecting not only audible sound but also sound outside the audible area, for example, an ultrasonic wave generated by the inspection target object A2. By collecting and analyzing the ultrasonic wave emitted from the inspection target object A2, the wireless slave device 10 can easily detect the abnormality of the inspection target object A2 accurately and early.

The input and output circuit 56 is an interface for inputting and outputting a digital signal. The input and output circuit 56 has a function of outputting a digital signal input from the microphone 55 to the feature extraction unit 16 of the analysis unit 12.

For example, a network interface card (NIC), a low-power wireless module for the Internet of Things (IoT), or the like is used as the communication circuit 57, and various types of data can be transmitted and received between devices via a wireless communication path including a wireless local area network (LAN), a multi-hop low-power radio wave, or the like connected to the NIC. In the wireless slave device 10, the wireless communication unit 13 can control the operation of the communication circuit 57 to transmit the packet D1 to the wireless relay 20 or transfer the packet D1 received from another wireless slave device 10 to the wireless relay 20.

The built-in battery 58 is mounted on the wireless slave device 10, and supplies power to each unit in the computer 50 under the control of the power supply unit 14 illustrated in FIG. 1. The built-in battery 58 according to the present embodiment is assumed to be a primary battery. However, the built-in battery 58 may be a secondary battery.

Figure 5:
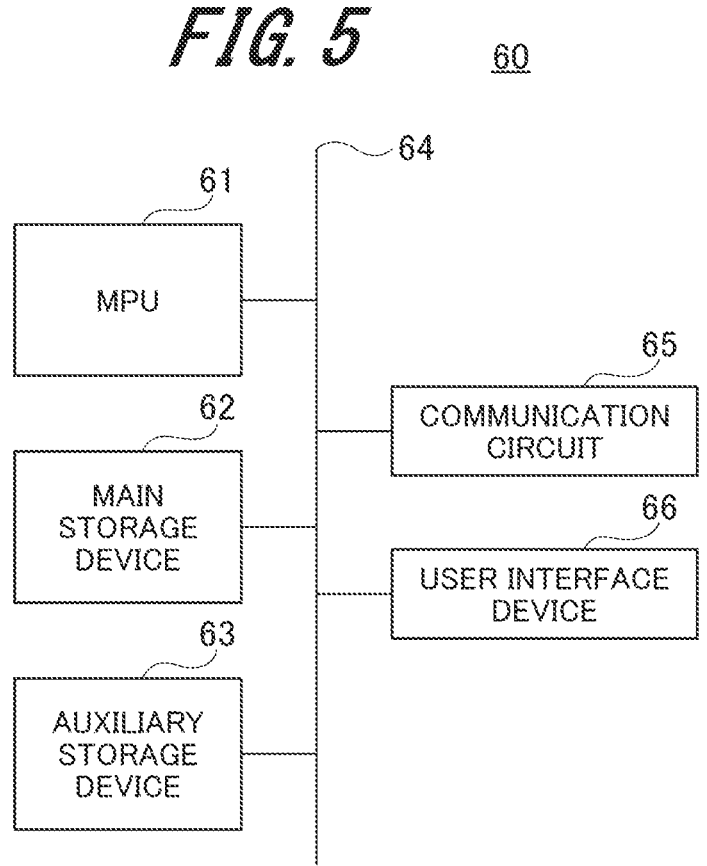
FIG. 5 is a block diagram illustrating a hardware configuration example of a computer constituting a wireless relay, the wireless master device, and the monitoring terminal according to the first embodiment of the present invention.

FIG. 5 is a block diagram illustrating a hardware configuration example of the computer 60 constituting the wireless relay 20, the wireless master device 30, and the monitoring terminal 40.

The computer 60 is hardware used as a computer used in the wireless relay 20, the wireless master device 30, and the monitoring terminal 40. The computer 60 includes an MPU 61, a main storage device 62, an auxiliary storage device 63, a bus 64, a communication circuit 65, and a user interface device 66. The blocks are communicably connected to each other via a bus 64.

The MPU 61 reads program codes of software for realizing each function of the wireless relay 20, the wireless master device 30, and the monitoring terminal 40 according to the present embodiment from the auxiliary storage device 63, loads the program codes into the main storage device 62, and executes the program codes.

Variables, parameters, and the like generated in the middle of arithmetic processing of the MPU 61 are temporarily written in the main storage device 62, and the variables, the parameters, and the like are appropriately read by the MPU 61. In the wireless relay 20, the function of controlling the wireless communication unit 21 to transfer the packet D1 received from the wireless slave devices 10 and 10' to the wireless master device 30 is realized by the MPU 61. In the wireless master device 30, the wireless communication unit 31 controls the operation of the communication circuit 65 to capture the packet D1 transferred from the wireless relay 20, and the MPU 61 stores various types of data extracted from the data section of the packet D1 in the data storage unit 32. Further, in the wireless master device 30, the function of disclosing the data extracted from the data storage unit 32 by the data disclosure unit 33 to the monitoring terminal 40 is realized by the MPU 61. In the monitoring terminal 40, the function of receiving the data subjected to the disclosure processing by the data disclosure unit 33 and presenting the data to the worker through the user interface device 66 is realized by the MPU 61.

As the auxiliary storage device 63, for example, a hard disk drive (HDD), a solid state drive (SSD), a flexible disk, an optical disk, a magneto-optical disk, a CD-ROM, a CD-R, a magnetic tape, a nonvolatile memory, or the like is used. In addition to the OS and various parameters, a program for causing the computer 60 to function is recorded in the auxiliary storage device 63. The auxiliary storage device 63 permanently records a program, data, and the like necessary for the MPU 61 to operate, and is used as an example of a computer-readable non-transitory recording medium storing a program executed by the computer 60. In the wireless master device 30, the function of the data storage unit 32 is realized by the auxiliary storage device 63. In the monitoring terminal 40, the function of accumulating the analysis result transmitted from the wireless master device 30 is realized by the auxiliary storage device 63.

For example, an NIC or the like is used as the communication circuit 65 in the monitoring terminal 40, and various types of data can be transmitted and received between devices via a wireless communication path including a wireless LAN or the like connected to the NIC or a wired communication path. In the wireless relay 20 and the wireless master device 30, a low-power wireless module for IoT or the like is used for the communication circuit 65. In the wireless relay 20, the wireless communication unit 21 can control the operation of the communication circuit 65 to transfer the packet D1 received from the wireless slave device 10 to the wireless master device 30. In the wireless master device 30, the wireless communication unit 31 controls the operation of the communication circuit 65 to receive the packet D1 transmitted from the wireless relay 20. Further, the wireless master device 30 can transmit data to the monitoring terminal 40 through the communication circuit 65. In the monitoring terminal 40, a wireless communication unit (not illustrated) controls the operation of the communication circuit 65 to receive data transmitted from the wireless master device 30.

As the user interface device 66, for example, a liquid crystal display monitor, a touch panel device, a mouse, a keyboard, or the like is used. The worker can check the data displayed on the user interface device 66 and input various commands through the user interface device 66. The user interface device 66 is mainly provided in the monitoring terminal 40. The user interface device 66 may not be provided in the wireless relay 20 and the wireless master device 30.

In a case where the computer 60 is mounted on the wireless master device 30 and the monitoring terminal 40, power can be supplied from a wired power supply to each unit, but the description of the power supply will be omitted. In addition, in a case where there is no supply of power from an external power supply to the wireless relay 20, the wireless relay 20 may also include a built-in battery.

[Processing of Wireless Slave Device]

Next, an example of processing performed by the wireless slave device 10 will be described with reference to FIG. 6.

Figure 6:
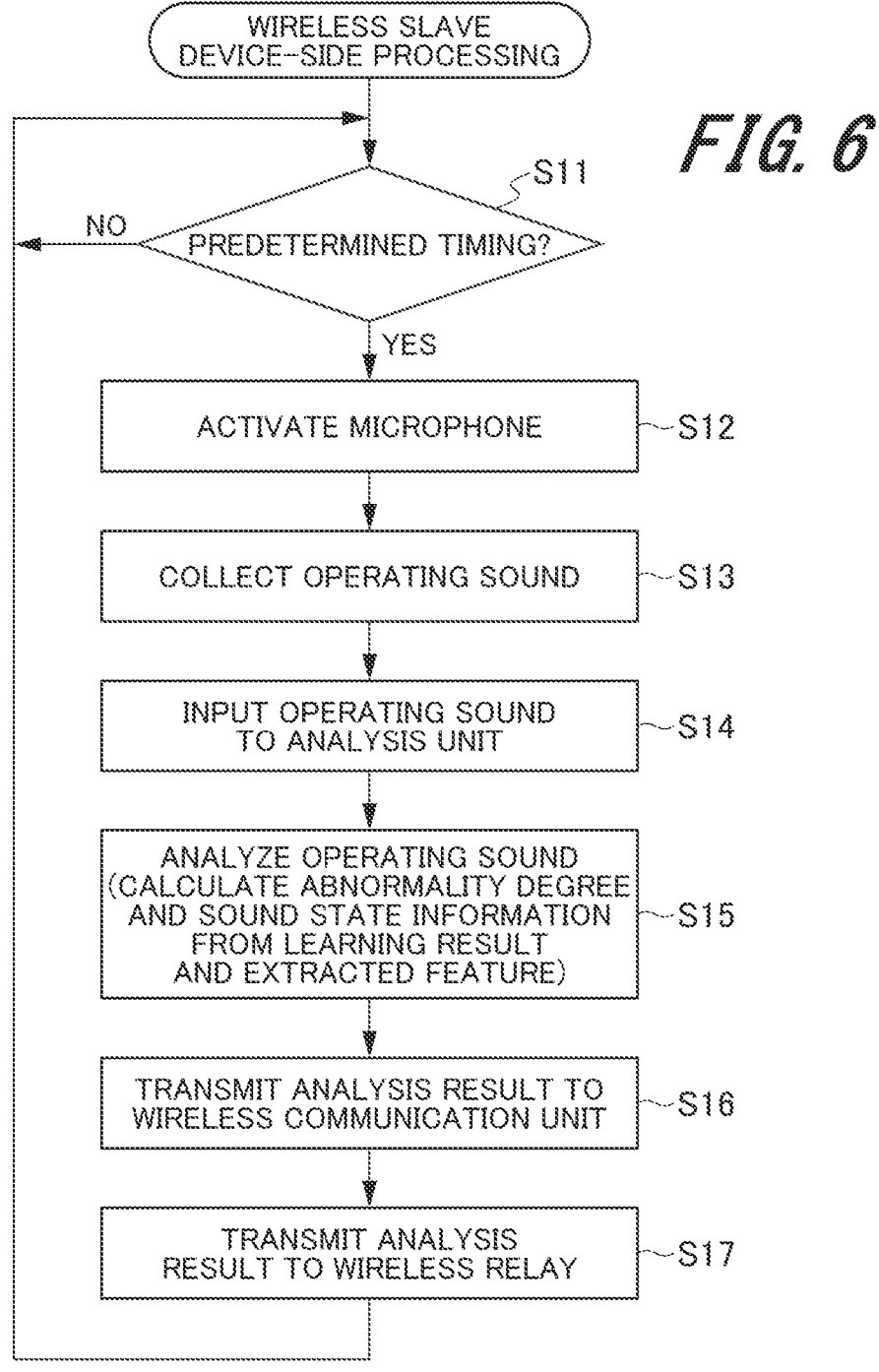
FIG. 6 is a flowchart illustrating an example of processing performed by the wireless slave device according to the first embodiment of the present invention.

FIG. 6 is a flowchart illustrating an example of the processing performed by the wireless slave device 10. Detailed description of processing that is similar to the processing performed by the wireless slave device 10 and is performed by the wireless slave device 10' will be omitted.

The wireless slave device 10 monitors whether a predetermined timing has arrived (S11). When the predetermined timing has not arrived (S11: NO), the wireless slave device 10 continues to monitor the arrival of the timing again.

When the predetermined timing has arrived (S11: YES), the wireless slave device 10 supplies power from the power supply unit 14 to the sound collection unit 11 to activate the microphone 55 (S12). The predetermined timing may be a predetermined or undefined period. Furthermore, the wireless slave device 10 may set the predetermined timing in accordance with an instruction from the wireless master device 30 transmitted to the wireless slave device 10 via the wireless relay 20.

The sound collection unit 11 collects the operating sound of the inspection target object A2 (S13). The operating sound collected by the sound collection unit 11 is input to the analysis unit 12 (S14).

The analysis unit 12 analyzes the operating sound input from the sound collection unit 11, and detects the degree of difference between the normal sound and the operating sound, as an analysis result, based on the learning result 15 of the normal sound learned in advance and the feature extracted from the operating sound (S15). Here, the analysis unit 12 calculates the abnormality degree and the sound state information and obtains the abnormality degree and the sound state information as the analysis result. The analysis unit 12 transmits the analysis result to the wireless communication unit 13 (S16).

The wireless communication unit 13 generates the packet D1 based on the analysis result received from the analysis unit 12 and transmits the packet D1 to the wireless relay 20 (S17).

[Processing of Wireless Relay and Wireless Master Device]

Next, an example of processing performed by the wireless relay 20 and the wireless master device 30 will be described with reference to FIG. 7.

Figure 7:
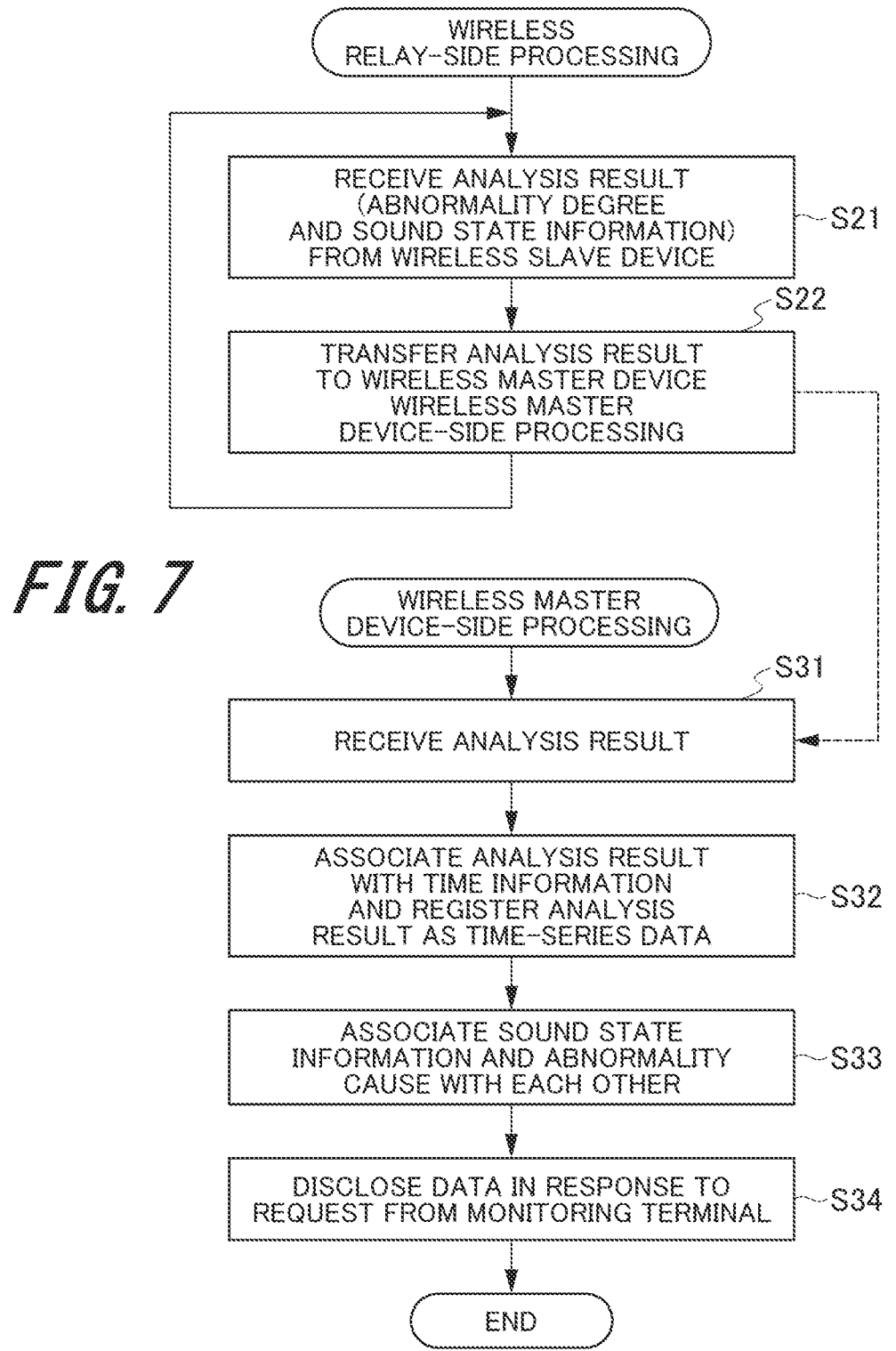
FIG. 7 is a flowchart illustrating an example of processing performed by the wireless relay and an example of processing performed by the wireless master device according to the first embodiment of the present invention.

FIG. 7 is a flowchart illustrating an example of processing performed by the wireless relay 20 and an example of processing performed by the wireless master device 30.

First, processing of the wireless relay 20 will be described.

When receiving the packet D1 including the analysis result (abnormality degree and sound state information) from the wireless slave device 10 (S21), the wireless relay 20 transfers the packet D1 including the analysis result to the wireless master device 30 (S22). The packet D1 transmitted from the wireless slave device 10 reaches the wireless master device 30 in accordance with the network address or the identification information included in the header even in a case where the packet D1 passes through another device in the middle.

When receiving the packet D1 including the analysis result (abnormality degree and sound state information) from the wireless slave device 10 via the wireless relay 20 (S31), the wireless master device 30 extracts the analysis result from the packet D1 and converts the analysis result into data (S32). The conversion into data is to register the time information of the time when the packet D1 has been collected and the analysis result in the data storage unit 32 as time series data by storing the time information and the analysis result in association with each other. In a case where the data disclosure unit 33 determines, from the analysis result, that there is an unknown abnormality (in a case where the abnormality degree is higher than a threshold value and the abnormality cause is not associated), the data disclosure unit 33 stores the sound state information of the collected sound in association with the abnormality cause (S33). This processing may be performed by the data storage unit 32.

Then, the wireless master device 30 transmits time-series data (an example of the analysis result) in response to a request from the monitoring terminal 40, and the monitoring terminal 40 determines the state of the inspection target object A2 from the analysis result and discloses the state (S34). The time-series data disclosed in response to the request is displayed on a predetermined user interface of the user interface device 66 in the monitoring terminal 40.

[Average Value and Standard Deviation of Abnormality Degree]

Figure 8:
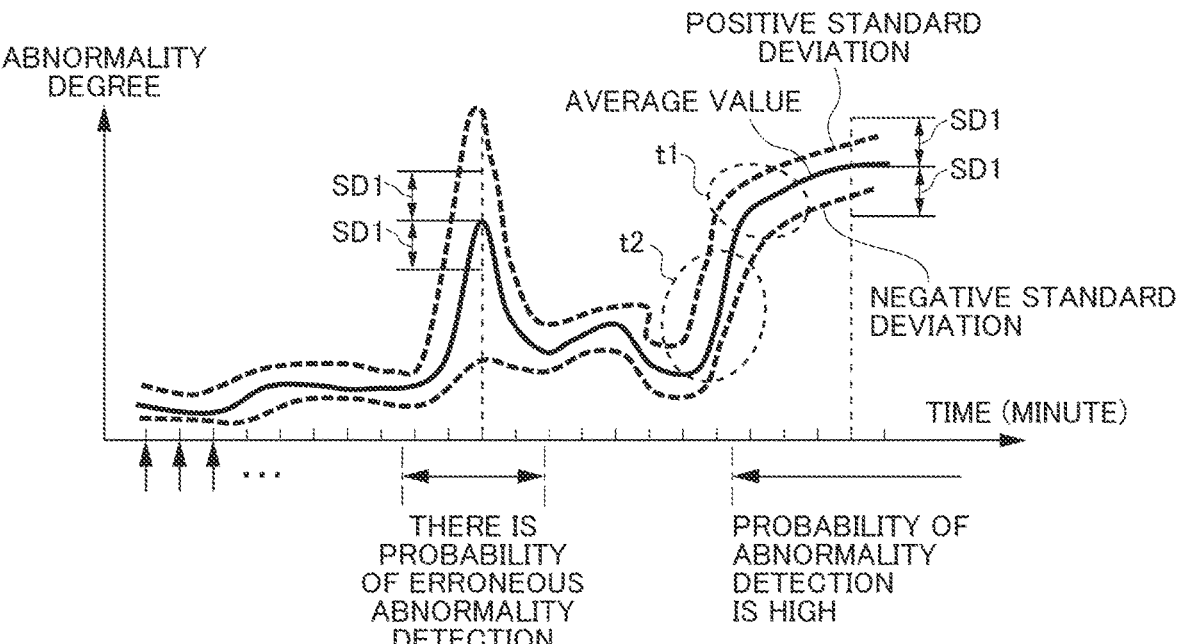
FIG. 8 is a graph illustrating a temporal change of an abnormality degree according to the first embodiment of the present invention.

FIG. 8 is a graph illustrating a temporal change of the abnormality degree. In FIG. 8, the vertical axis represents the abnormality degree, and the horizontal axis represents time. In addition, the vertical line plotted on the horizontal axis represents the timing at which the wireless slave device 10 transmits the average value of the abnormality degree and the standard deviation of the abnormality degree as the analysis result.

FIG. 8 illustrates both the average value of the abnormality degree and the standard deviation of the abnormality degree, which are calculated by the abnormality-degree and sound-state-information calculation unit 17. The abnormality-degree and sound-state-information calculation unit 17 can calculate the average value of the abnormality degree of the inspection target object A2, and positive and negative standard deviations for the average value of the abnormality degree. In FIG. 8, the broken line on the upper side of the average value of the abnormality degree is represented as the positive standard deviation, and the broken line on the lower side of the average value of the abnormality degree is represented as the negative standard deviation.

The probability of the abnormality occurring in the inspection target object A2 is represented by the point that both the average value of the abnormality degree and the standard deviation of the abnormality degree are high over a predetermined period or longer. Then, the abnormality-degree and sound-state-information calculation unit 17 can detect the abnormality in the inspection target object A2 in a case where the abnormality degree becomes higher than a predetermined threshold value. In a case where the abnormality-degree and sound-state-information calculation unit 17 detects the abnormality in the inspection target object A2, that is, in a case where both the average value of the abnormality degree and the standard deviation of the abnormality degree, which are obtained from the analysis result by the data disclosure unit 33, are high over a predetermined period or longer, the wireless master device 30 can notify the monitoring terminal 40 of the occurrence of the abnormality in the inspection target object A2 by issuing an alarm or the like to the monitoring terminal 40.

However, in a case where the standard deviation of the abnormality degree has a value equal to or greater than a predetermined value even though the average value of the abnormality degree is high, there is a high probability that the abnormality-degree and sound-state-information calculation unit 17 has erroneously detected the abnormality in the inspection target object A2. On the other hand, in a case where the average value of the abnormality degree is high over a predetermined period or longer, and the standard deviation of the abnormality degree continues continuously has a value smaller than a predetermined value, there is a high probability that the abnormality-degree and sound-state-information calculation unit 17 has correctly detected the abnormality in the inspection target object A2.

Therefore, for example, in a case where the average value of the abnormality degree is equal to or greater than the threshold value and the standard deviation of the abnormality degree is equal to or greater than a predetermined value SD1, the data disclosure unit 33 of the wireless master device 30 determines that the abnormality-degree and sound-state-information calculation unit 17 has erroneously detected the abnormality in the inspection target object. On the contrary, in a case where the average value of the abnormality degree is equal to or greater than the threshold value and the standard deviation of the abnormality degree is smaller than the predetermined value SD1, the data disclosure unit 33 determines that the abnormality-degree and sound-state-information calculation unit 17 has correctly detected the abnormality in the inspection target object.

The data disclosure unit 33 specifies the abnormality cause 322 from the sound state information 323 of the sound in which the abnormality is detected. Then, the data disclosure unit 33 notifies the monitoring terminal 40 of information (for example, identification information) on the inspection target object A2 having a high probability that an abnormality has occurred, and the abnormality cause. When the worker who operates the monitoring terminal 40 confirms this notification (the identification information and the abnormality cause of the inspection target object A2), the worker can perform an early inspection of the inspection target object A2 and take measures such as repair and replacement of the inspection target object A2 as necessary.

In a case where there is a high probability that the abnormality-degree and sound-state-information calculation unit 17 has erroneously detected an abnormality, the wireless master device 30 does not issue an alarm to the monitoring terminal 40. On the other hand, in a case where there is a high probability that the abnormality-degree and sound-state-information calculation unit 17 has correctly detected the abnormality, the wireless master device 30 issues an alarm to the monitoring terminal 40 to attract the attentions of the worker. As described above, since the wireless master device 30 can determine the accuracy of the abnormality by using the average value of the abnormality degree and the standard deviation of the abnormality degree, the alarm does not occur frequently even though the abnormality becomes instantaneously high. Note that, the predetermined value SD1 may be appropriately changed in accordance with the type of the inspection target object A2 and the state of the inspection target object A2 deteriorated over time. In addition, the predetermined value SD1 may be set to a different value in accordance with the positive and negative standard deviations.

In the conventional abnormality detection method, the worker listens to the sound of the inspection target object A2 with his/her own ear to determine whether or not the abnormality has occurred. Thus, when the sound of the inspection target object A2 is not sufficiently large as indicated at the time t1, it is not possible to detect the abnormality. On the other hand, in the abnormality detection method according to the present embodiment, the worker is notified of the detection of the abnormality at the time t2 earlier than the time t1, based on the point that both the average value of the abnormality degree and the standard deviation of the abnormality degree are high. Therefore, by using the abnormality detection method according to the present embodiment, the worker can take measures for the abnormality in the inspection target object A2 at a timing earlier than a timing in the conventional abnormality detection method. In addition, when the abnormality is detected, an abnormality cause is specified based on the sound state information at this time and the worker is notified of the abnormality cause. Thus, the worker can quickly grasp the abnormality cause.

[Setting of Learning Result]

Meanwhile, the load of the processing of learning a normal sound is high. Thus, it is not appropriate to cause the wireless slave device 10 having limited available power and storage area to perform the learning processing. Therefore, when the wireless slave device 10 is installed, the worker prepares the learning result setting terminal 7 and performs an operation to set the learning result 15 in the wireless slave device 10. Therefore, an example of the configuration and processing of the learning result setting terminal 7 that sets the learning result 15 will be described with reference to FIGS. 9 and 10.

Figure 9:
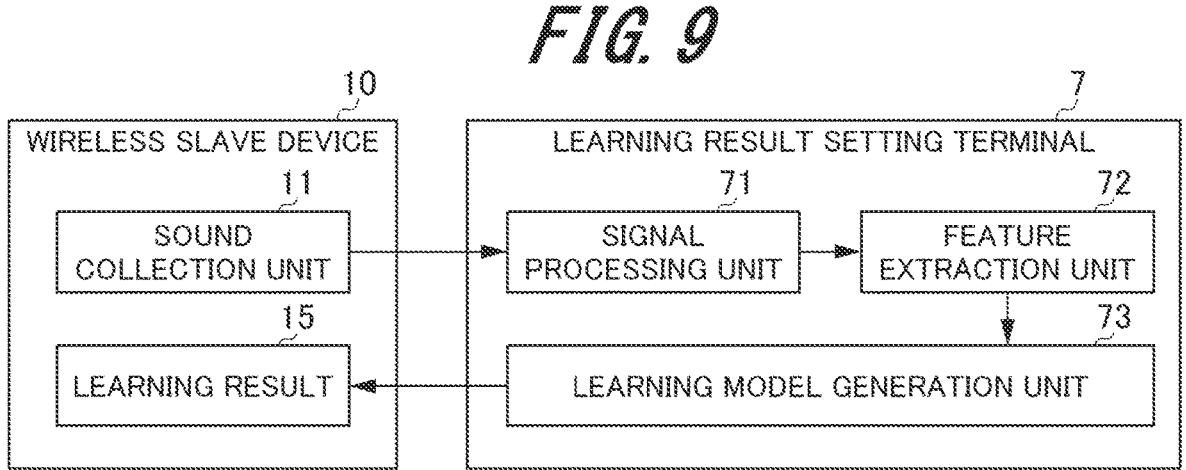
FIG. 9 is a block diagram illustrating an internal configuration example of a learning result setting terminal connected to the wireless slave device according to the first embodiment of the present invention.

FIG. 9 is a block diagram illustrating an internal configuration example of the learning result setting terminal 7 connected to the wireless slave device 10.

Figure 10:
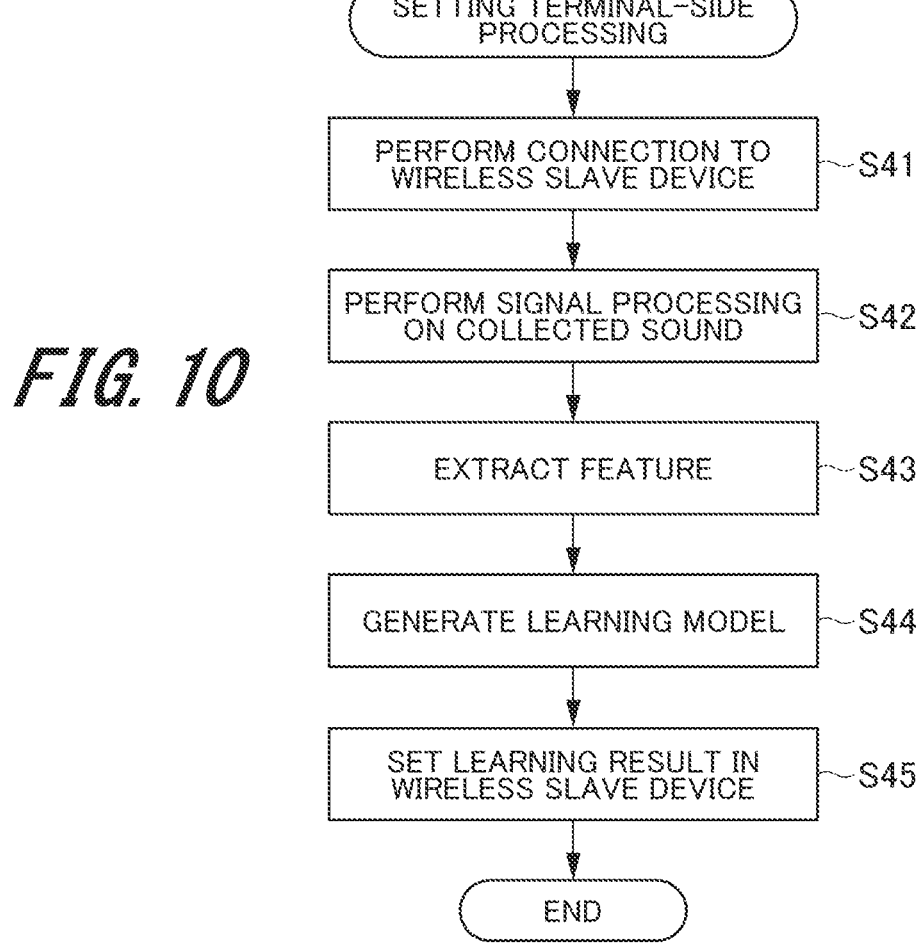
FIG. 10 is a flowchart illustrating an example of processing of the learning result setting terminal according to the first embodiment of the present invention.

FIG. 10 is a flowchart illustrating an example of processing of the learning result setting terminal 7.

As the learning result setting terminal 7, a notebook or tablet computer device or the like that can be carried by the worker is used. The computer 60 illustrated in FIG. 5 may be applied as the hardware configuration of the learning result setting terminal 7. The learning result setting terminal 7 includes a signal processing unit 71, a feature extraction unit 72, and a learning model generation unit 73.

First, the worker connects the learning result setting terminal 7 to the wireless slave device 10 at the time of installation of the wireless slave device 10 (S41). Then, the signal processing unit 71 performs various types of signal processing such as input processing, noise removal, amplification processing, and the like of the digital signal of the sound output from the sound collection unit 11 of the wireless slave device 10 (S42).

Then, the feature extraction unit 72 extracts the feature of the sound generated by the inspection target object A2 based on the digital signal processed by the signal processing unit 71 (S43). The operation of setting the learning result 15 by using the learning result setting terminal 7 is often performed when the worker knows in advance that the operation of the inspection target object A2 is normal. Therefore, the feature of the sound extracted by the feature extraction unit 72 is handled as the feature of the normal sound.

Then, the learning model generation unit 73 generates a learning model by using the extracted feature as an input (S44). The learning model generation unit 73 is realized by using artificial intelligence (AI), for example. Here, in the case of inspection target objects A2 of the same model, even though the installation places are different, the features of the sounds are often similar. Therefore, the learning model generation unit 73 can improve the accuracy of the learning model by repeating the processing of generating the learning model based on the feature extracted for the sound generated by many inspection target objects A2.

Then, the learning model generation unit 73 sets the learning result 15 generated using the learning model, in the wireless slave device 10 (S45). After the setting of the learning result 15 is completed, this processing is ended. As described above, the wireless slave device 10 itself can perform processing of obtaining the degree of difference between the sound collected by the sound collection unit 11 and the normal sound learned in advance, as the analysis result, by using the appropriate learning result 15 set by the learning result setting terminal 7 even though the learning processing is not performed.

Note that FIGS. 9 and 10 illustrate an example in which the learning result setting terminal 7 performs the learning processing. For example, a cloud server accessible by the learning result setting terminal 7 via the Internet may perform the learning processing. In this case, the learning result setting terminal 7 does not generate the learning model, but transmits digital data of the sound collected by the sound collection unit 11 to the cloud server and requests the cloud server to perform the learning processing. Then, the learning result setting terminal 7 receives the learning result 15 calculated by the cloud server from the cloud server, and performs processing of setting the learning result 15 in the wireless slave device 10.

In the automatic inspection system 1 according to the first embodiment described above, the sound collection unit 11 is provided in the wireless slave device 10, and the wireless slave device 10 activates the sound collection unit 11 at a predetermined timing (for example, periodically) and causes the sound collection unit 11 to collect the operating sound of the inspection target object A2. In the automatic inspection system 1, instead of transmission of sound data in the entirety of the frequency band in which the sound collection unit 11 can collect sound from the wireless slave device 10 to the wireless master device 30, the packet D1 including the degree of difference from the normal sound learned in advance, which is a small portion of the sound data, and the sound state information of the collected sound as the analysis result is transmitted to the wireless master device 30. Therefore, it is possible to reduce the data size of the packet D1 of the analysis result transmitted from the wireless slave device 10 to the wireless master device 30 in comparison to the data size of the sound data collected by the sound collection unit 11 as it is.

In addition, since the wireless slave device 10 is intermittently driven and transmits the packet D1 having the minimum size from which the wireless master device 30 can extract the analysis result, it is possible to reduce the power consumption of the wireless slave device 10. Therefore, the wireless slave device 10 can reduce the power energy required to transmit the analysis result once and suppress the power consumption of the built-in battery 58. As a result, since the lifespan of the built-in battery 58 in the wireless slave device 10 is prolonged, it is possible to reduce the frequency of battery replacement of the wireless slave device 10.

In addition, by associating the sound state information with the abnormality cause in the wireless master device 30, when an abnormality is detected in the collected sound, the worker can quickly identify (grasp) the abnormality cause based on the sound state information. Then, by quickly specifying the abnormality cause, the worker can perform planned and efficient maintenance. For example, when the bearing of the motor is deteriorated, the worker can check the stock, purchase a replacement part as necessary, and plan the replacement work time and securing the worker.

In addition, the wireless slave device 10 transmits, to the wireless master device 30, a portion of information extracted from the sound data acquired from the inspection target object A2 over a long period. The wireless master device 30 manages the characteristics of the sound data acquired by the wireless slave device 10. When detecting an abnormality, the wireless master device 30 notifies the monitoring terminal 40 of the probability of the abnormality occurring in the inspection target object A2 and the abnormality cause. Therefore, the worker who uses the monitoring terminal 40 can remotely monitor the state of the inspection target object A2, and it is possible to reduce the opportunity to approach the inspection target object A2 and inspect the abnormal sound. Therefore, it is possible to not only reduce the operation cost of the inspection target object A2, but also improve the usability of the automatic inspection system 1.

If the wireless master device 30 is within the range of a communicable distance of the wireless slave device 10, the wireless relay 20 may not be provided in the automatic inspection system 1, and the wireless slave device 10 may be configured to directly communicate with the wireless master device 30.

In addition, the sound collection unit 11 may not include the AD conversion unit and may be configured to output an analog signal of the sound generated by the inspection target object A2. In this case, the analysis unit 12 is configured to include an AD conversion unit at a preceding stage of the feature extraction unit 16. The AD conversion unit of the analysis unit 12 samples and quantizes the amplitude of the analog signal of the sound input from the sound collection unit 11 at a predetermined cycle, converts the analog signal into a digital value, and outputs the digital value to the feature extraction unit 16. The subsequent processing is performed in a similar manner to the processing of each unit according to the first embodiment.

[Configuration Example in which Microphone is Separated from Wireless Slave Device]

Figure 11:
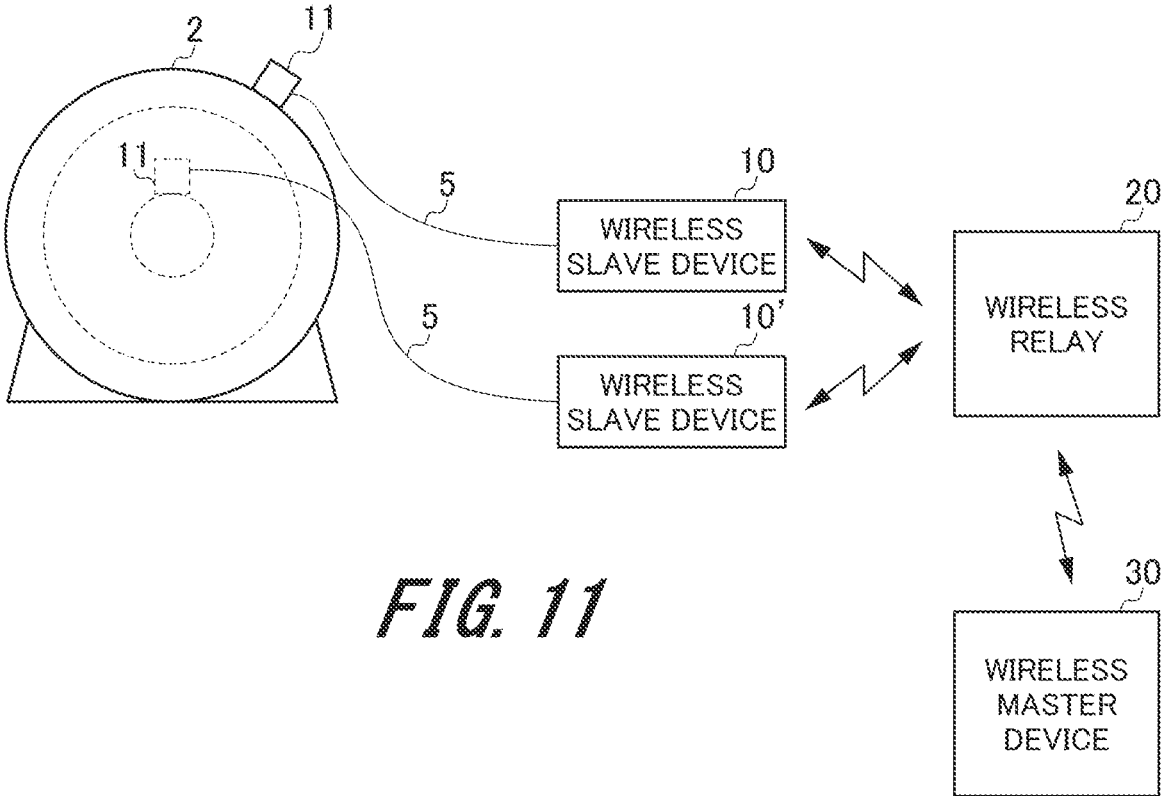
FIG. 11 is a view illustrating an example of a place of mounting the wireless slave device according to the first embodiment of the present invention.

FIG. 11 is a diagram illustrating an example of a place of mounting the wireless slave device 10.

The wireless slave device 10 illustrated in FIG. 1 incorporates the sound collection unit 11, and the wireless slave device 10 is installed at a position away from the inspection target object A2. However, as illustrated in FIG. 11, the sound collection unit 11 provided in the wireless slave device 10 may be configured to be detached from the housing of the wireless slave device 10, separated from the wireless slave device 10, and attachable to the inspection target object A2.

Since the size of the sound collection unit 11 (microphone 55) is smaller than the size of the housing of the wireless slave device 10, the sound collection unit 11 can be directly attached to the inspection target object A2. For example, in a case where the inspection target object A2 is an electric motor, the sound collection unit 11 can be directly attached to the bearing of the electric motor or the outside of an electric motor cover. Since the sound collection unit 11 is directly attached to each unit of the electric motor as described above, the sound collected by the sound collection unit 11 is less likely to be influenced by the environmental sound around the electric motor.

The sound collection unit 11 and the wireless slave device 10 are connected by a power line and a signal line extended from the wireless slave device 10. The power line and the signal line are housed in a cable 5 that connects the sound collection unit 11 and the wireless slave device 10. The sound collection unit 11 is operated by power supplied from the power supply unit 14 (built-in battery 58) through the power line. In addition, the sound collection unit 11 outputs a digital signal of the sound collected from the inspection target object A2 to the analysis unit 12 of the wireless slave device 10 through the signal line. The analysis unit 12 can analyze the sound based on the digital signal of the sound generated only from the inspection target object A2, which does not include the surrounding noise.

FIRST CONFIGURATION EXAMPLE OF MULTI-HOP NETWORK (SINGLE MANAGER)

FIG. 12 is a diagram illustrating a first configuration example (single manager) of a multi-hop network of the automatic inspection system 1 according to the first embodiment of the present invention.

As illustrated in FIG. 1, the automatic inspection system 1 includes a plurality of wireless slave devices 10 and 10' and the wireless relay 20. Normally, the wireless relay 20 being a destination to which the wireless slave devices 10 and 10' first transmit the packet D1 is determined in advance. However, the environment in which the wireless slave devices 10 and 10' are installed is often in a plant in which facilities having various shapes are arranged. Therefore, when the wireless slave devices 10 and 10' are installed, and then a new facility 6 is installed, it is not possible to transmit the packet D1 from the wireless slave devices 10 and 10' to the wireless relay 20.

Here, a multi-hop network according to a first configuration example configured by the automatic inspection system 1 will be described. In the multi-hop network, a plurality of wireless slave devices 10 and 10' can transfer the packet D1. An example in which wireless slave devices 10(1) to 10(4) denoted by the reference signs (1) to (4) are provided in the multi-hop network in order to identify a plurality of wireless slave devices 10 and 10' will be described. In addition, an example in which wireless relays 20(1) and 20(2) denoted by the reference signs (1) and (2) are provided in the multi-hop network in order to identify a plurality of wireless relays 20 will be described.

The wireless slave device 10(1) collects sound generated from the inspection target object A2, and the wireless slave device 10(2) collects sound generated from the inspection target B3. Then, the wireless slave devices 10(3) and 10(4) collect sound generated from different locations of an inspection target object C4. For example, packets D1 are transmitted from the two wireless slave devices 10(1) and 10(2) to the wireless relay 20(1) illustrated on the left side of FIG. 12. In addition, it is assumed that the packets D1 are also transmitted from the two wireless slave devices 10(3) and 10(4) to the wireless relay 20(2) illustrated on the right side of FIG. 12.

However, it is assumed that a facility 6 is installed between the wireless relay 20(2) illustrated on the right side of FIG. 12, and the two wireless slave devices 10(3) and 10(4), and thus a direct communication between the wireless relay 20(2), and the two wireless slave devices 10(3) and 10(4) is not possible. As described above, when the wireless slave devices 10(3) and 10(4) among the plurality of wireless slave devices 10(1) to 10(4) detects that transmission of the packet D1 to the wireless relay 20(2) is not possible, another wireless slave device 10(2) capable of transmitting data to another wireless relay 20(1) is requested to transfer the packet D1.

Therefore, the wireless slave devices 10(3) and 10(4) that cannot transmit the packet D1 to the wireless relay 20(2) search for the wireless slave devices 10(1) and 10(2) capable of transmitting the packet D1 to the other wireless relay 20(1). The wireless slave devices 10(3) and 10(4) that cannot transmit the packet D1 transfer the packet D1 to the wireless slave device 10(2) capable of transmitting the packet D1. At this time, the wireless slave device 10(3) transmits the packet D1 of the wireless slave device 10(3) to the wireless slave device 10(2), and further transfers the packet D1 transmitted from the wireless slave device 10(4) to the wireless slave device 10(2).

The other wireless slave device 10(2) transfers the packet D1 transmitted from the wireless slave devices 10(3) and 10 (4) to the wireless relay 20(1). That is, the wireless slave device 10(2) transmits the packet D1 of the wireless slave device 10(2) to the wireless relay 20(1), and also transmits the packet D1 transmitted or transferred from the wireless slave device 10(3) to the wireless relay 20(1). Since the automatic inspection system 1 constitutes the multi-hop network in this manner, all the wireless slave devices 10(1) to 10(4) can transmit the packets D1 to the wireless master device 30 via the wireless relay 20(1).

Note that, when the wireless slave devices 10(2) and 10(3) continue to transfer the packet D1 over a long period, the power consumption of the built-in battery 58 in the wireless slave devices 10(2) and 10(3) becomes higher than that of the other wireless slave devices 10(1) and 10(4). Therefore, the monitoring terminal 40 may be notified of the presence of the wireless slave device 10(2) that has started to transfer the packet D1 transmitted from the other wireless slave devices 10(3) and 10(4), through the wireless master device 30(1). With this notification, the worker can know a situation in which the wireless slave devices 10(3) and 10(4) and the wireless relay 20(2) cannot perform wireless communication. Then, the worker can take measures such as movement of the wireless slave devices 10(3) and 10(4) to positions at which the worker can communicate with the wireless relay 20(2) or movement of the facility 6.

The monitoring terminal 40 can monitor the state of the inspection target object A2 at a place away from the plant where the inspection target object A2 is installed via the external Internet.

SECOND CONFIGURATION EXAMPLE OF MULTI-HOP NETWORK (MULTI-MANAGER)

FIG. 13 is a diagram illustrating a second configuration example (multi-manager) of the multi-hop network of the automatic inspection system 1 according to the first embodiment of the present invention.

Here, a multi-hop network according to a second configuration example configured by the automatic inspection system 1 will be described. The automatic inspection system 1 can constitute a multi-hop network without the wireless relay 20. An example in which wireless master devices 30(1) and 30(2) denoted by the reference signs (1) and (2) are provided in the multi-hop network in order to identify a plurality of wireless master devices 30 will be described. That is, in this multi-hop network, the wireless relays 20(1) and 20(2) illustrated in FIG. 12 are replaced with two wireless master devices 30 (1) and 30(2). The wireless master devices 30(1) and 30(2) are connected to the monitoring terminal 40 via a communication network such as the Internet.

In the multi-hop network, a plurality of wireless slave devices 10 and 10' can transfer the packet D1. For example, packets D1 are transmitted from the two wireless slave devices 10(1) and 10(2) to the wireless master device 30(1) illustrated on the left side of FIG. 13. In addition, it is assumed that the packets D1 are also transmitted from the two wireless slave devices 10(3) and 10(4) to the wireless master device 30(2) illustrated on the right side of FIG. 13.

However, it is assumed that a facility 6 is installed between the wireless master device 30(2) illustrated on the right side of FIG. 13, and the two wireless slave devices 10(3) and 10(4), and thus a direct communication between the wireless master device 30(2), and the two wireless slave devices 10(3) and 10(4) is not possible. As described above, when the wireless slave devices 10(3) and 10(4) among the plurality of wireless slave devices 10(1) to 10(4) detects that transmission of the packet D1 to the wireless master device 30(2) is not possible, another wireless slave device 10 (2) capable of transmitting data to another wireless master device 30(1) is requested to transfer the packet D1.

Therefore, the wireless slave devices 10(3) and 10(4) that cannot transmit the packet D1 to the wireless master device 30(2) search for the wireless slave devices 10(1) and 10(2) capable of transmitting the packet D1 to the other wireless master device 30(1). The wireless slave devices 10(3) and 10(4) that cannot transmit the packet D1 transfer the packet D1 to the wireless slave device 10(2) capable of transmitting the packet D1. At this time, the wireless slave device 10(3) transmits the packet D1 of the wireless slave device 10(3) to the wireless slave device 10(2), and further transfers the packet D1 transmitted from the wireless slave device 10(4) to the wireless slave device 10(2).

The other wireless slave device 10(2) transfers the packet D1 transmitted from the wireless slave devices 10(3) and 10(4) to the wireless master device 30(1). That is, the wireless slave device 10(2) transmits the packet D1 of the wireless slave device 10(2) to the wireless master device 30(1), and also transmits the packet D1 transmitted or transferred from the wireless slave device 10(3) to the wireless master device 30(1). Since the automatic inspection system 1 constitutes the multi-hop network in this manner, all the wireless slave devices 10(1) to 10(4) can transmit the packets D1 to the monitoring terminal 40 via the wireless master device 30(1).

Note that, when the wireless slave devices 10(2) and 10(3) continue to transfer the packet D1 over a long period, the power consumption of the built-in battery 58 in the wireless slave devices 10(2) and 10(3) becomes higher than that of the other wireless slave devices 10(1) and 10(4). Therefore, the monitoring terminal 40 may be notified of the presence of the wireless slave device 10(2) that has started to transfer the packet D1 transmitted from the other wireless slave devices 10(3) and 10(4), through the wireless master device 30(1). With this notification, the worker can know a situation in which the wireless slave devices 10(3) and 10(4) and the wireless master device 30(2) cannot perform wireless communication. Then, the worker can take measures such as movement of the wireless slave devices 10(3) and 10(4) to positions at which the worker can communicate with the wireless master device 30(2) or movement of the facility 6.

THIRD CONFIGURATION EXAMPLE OF MULTI-HOP NETWORK (MULTI-MANAGER)

FIG. 14 is a diagram illustrating a third configuration example (multi-manager) of the multi-hop network of the automatic inspection system 1 according to the first embodiment of the present invention.

Here, a multi-hop network according to a third configuration example configured by the automatic inspection system 1 will be described. The multi-manager configuration of the multi-hop network according to the second configuration example illustrated in FIG. 13 may include a wireless relay 20 as illustrated in FIG. 14.

The automatic inspection system 1 illustrated in FIG. 14 can constitute a multi-hop network in a form including a plurality of wireless relays 20 and a plurality of wireless master devices 30. In this multi-hop network, the wireless relay 20(1) is connected to the wireless slave devices 10(1) and 10(2), and the wireless relay 20(2) is connected to the wireless slave devices 10(3) and 10(4). The wireless relay 20(1) and the wireless master device 30(1) are connected, and the wireless relay 20(2) and the wireless master device 30(2) are connected. The wireless master devices 30(1) and 30(2) are connected to the monitoring terminal 40 via a communication network such as the Internet.

Also in the multi-hop network according to the third configuration example, it is assumed that the facility 6 is installed between the wireless slave devices 10 (3) and 10(4), and the wireless relay 20(2), and the wireless relay 20(2) and the two wireless slave devices 10(3) and 10(4) cannot directly communicate with each other. In this case, the wireless slave devices 10(3) and 10(4) search for another wireless slave device 10(2). The wireless slave device 10 (4) transmits the packet D1 to the wireless slave device 10(3). The wireless slave device 10(3) transmits the packet D1 created by the wireless slave device 10(3) itself to the wireless slave device 10(2), and transfers the packet D1 received from the wireless slave device 10 (4) to the wireless slave device 10(2). Then, the wireless slave device 10 (2) transfers the packet D1 to the wireless relay 20(1), and thus the packets D1 of the wireless slave devices 10(3) and 10(4) are transmitted from the wireless relay 20(1) to the wireless master device 30(1), and are transmitted from the wireless master device 30(1) to the monitoring terminal 40 via the communication network.

Since the automatic inspection system 1 constitutes the multi-hop network according to the third configuration example in this manner, all the wireless slave devices 10(1) to 10(4) can transmit the packets D1 to the monitoring terminal 40 via the wireless relay 20(1) and the wireless master device 30(1). Note that, in order to prevent the continuous transfer of the packet D1 over a long period, the processing of notifying the monitoring terminal 40 that the wireless slave devices 10(2) and (3) have started to transfer the packet D1 is similar to the multi-hop network according to the first configuration example.

Second Embodiment

Next, a configuration example and an operation example of an automatic inspection system according to a second embodiment will be described with reference to FIG. 15. The inspection target object changes in temperature in accordance with the state of the inspection target object in many cases. Therefore, in the second embodiment, as compared with the first embodiment, a temperature sensor 18 is provided in the wireless slave device 10, so that a configuration in which a temperature element is provided as the state information of the facility at the time of the abnormality is made.

Figure 15:
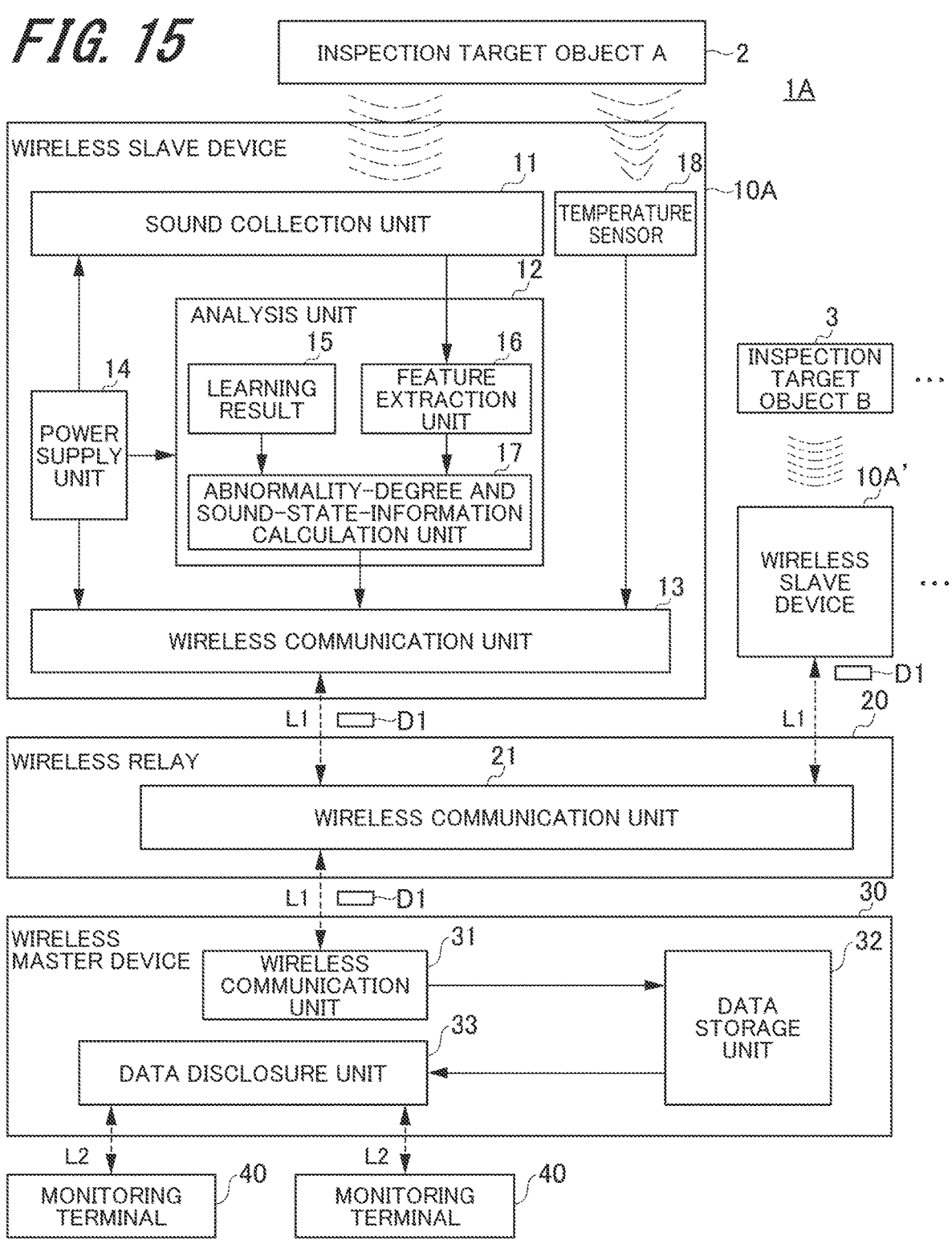
FIG. 15 is a block diagram illustrating an overall configuration example of an automatic inspection system according to a second embodiment of the present invention.

FIG. 15 is a block diagram illustrating an overall configuration example of an automatic inspection system 1A according to the second embodiment of the present invention. A wireless slave device 10A according to the present embodiment further includes the temperature sensor 18. Note that detailed description of a wireless slave device 10A' having the similar configuration to the wireless slave device 10A and detailed description of the same portions as the wireless relay 20, the wireless master device 30, and the monitoring terminal 40 according to the first embodiment will be omitted.

The temperature sensor 18 is a device that is installed at a position away from the inspection target object A2 (facility) by a predetermined distance and measures the temperature of the surface of the inspection target object A2 at a predetermined timing (for example, a predetermined period). It is desirable that the temperature sensor 18 be disposed so as to be able to measure the temperature of a portion of the inspection target object A2 at which heat generation is expected. In the present embodiment, an infrared sensor (radiation thermometer) or the like capable of measuring the temperature in a non-contact manner is used as the temperature sensor 18, but a contact type temperature sensor such as a thermistor is not excluded. Similar to the sound collection unit 11, the temperature sensor 18 desirably includes an AD conversion unit therein. In a case where the temperature sensor 18 does not include an AD conversion unit, an AD conversion unit (not illustrated) is provided in the wireless slave device 10A, and the AD conversion unit converts an output signal of the temperature sensor 18 into a digital value.

The wireless communication unit 13 converts the temperature measured by the temperature sensor 18 into packet data (generates a packet D1) together with the analysis result obtained by the analysis unit 12 (the abnormality degree and the sound state information of the sound data of the inspection target object A2), as the state information of the inspection target object A2. The wireless communication unit 13 wirelessly transmits the packet D1 in which destination information of the wireless master device 30 is added, to the wireless master device 30 via the wireless relay 20 at a predetermined timing.

The wireless master device 30 stores data including the temperature of the inspection target object A2 as the state information at the time of sound collection, in the data storage unit 32 together with the abnormality degree and the sound state information of the sound data received by the wireless communication unit 31, in association with the time of receiving the data. That is, the wireless master device 30 extracts the pieces of data from the packet D1 and converts the data into time-series data.

The data disclosure unit 33 uses the temperature of the inspection target object A2 as a material for reinforcing the determination at the time of determining the abnormality or identifying the abnormality cause. For example, when detecting the abnormality in the inspection target object A2 based on the abnormality degree 321 in FIG. 8, the data disclosure unit 33 confirms the abnormality in the inspection target object A2 if the measured temperature of the temperature sensor 18 is equal to or greater than a predetermined value.

Note that the data disclosure unit 33 may determine that the inspection target object A2 is abnormal when the abnormality degree 321 of the sound data is lower than a threshold value (for example, the average value) by several percentages in FIG. 8, but the measured temperature of the temperature sensor 18 is equal to or greater than the predetermined value. As a result, in a case where an abnormality is suspected from the abnormality degree 321, or in a case where it is not possible to determine an abnormality only from the abnormality degree 321, it is possible to reliably determine the abnormality in the inspection target object A2 by using the measured temperature of the temperature sensor 18.

In addition, in a case where, in FIG. 8, the abnormality degree of the sound data is lower than the threshold value (for example, the average value) by a predetermined value or several percentages, but the measured temperature of the temperature sensor 18 is equal to or greater than the predetermined value, the data disclosure unit 33 may request the wireless slave device 10A to transmit more detailed information (other information 324) in order to determine the abnormality in the inspection target object A2 and specify the abnormality cause. As described above, in a case where the abnormality of the inspection target object A2 is suspected from the abnormality degree 321 and the measured temperature of the temperature sensor 18, more detailed information (the other information 324) regarding the sound collected from the wireless slave device 10A is acquired. In this manner, the abnormality determination and specifying of the abnormality cause can be performed in consideration of more detailed information.

In addition, when detecting the abnormality in the inspection target object A2 based on the abnormality degree in FIG. 8, the data disclosure unit 33 may specify the abnormality cause of the inspection target object A2 based on the sound state information and the measured temperature of the temperature sensor 18. By storing the sound state information 323 and the measured temperature of the temperature sensor 18 in the data storage unit 32 in advance in association with the abnormality cause 322, the data disclosure unit 33 can specify the more accurate abnormality cause 322 based on the sound state information 323 and the measured temperature of the temperature sensor 18.

The automatic inspection system 1A according to the second embodiment described above has the following effects in addition to the effects similar to those of the automatic inspection system 1 according to the first embodiment. In the present embodiment, when an abnormality is determined or an abnormality cause is specified, it is possible to perform more accurate abnormality determination and specifying of the abnormality cause in consideration of the temperature of the inspection target object measured by the temperature sensor 18 in addition to the abnormality degree and the sound state information of the collected sound.

Note that it should be noted that the present invention is not limited to each of the above-described embodiments, and it goes without saying that various other application examples and modification examples can be taken as long as the gist of the present invention described in the claims is not deviated. Each constituent element of the present invention can be freely selected, and an invention having a selected configuration is also included in the present invention. Furthermore, the configurations described in the claims can be combined in addition to the combinations specified in the claims, and the configurations and the processing methods in the embodiments can be appropriately changed within the scope of achieving the object of the present invention.

Control lines and information lines in the drawings, which are considered necessary for the descriptions, are illustrated, and not all the control lines and the information lines in the product are necessarily shown. In practice, it may be considered that almost all components are connected to each other.

REFERENCE SIGNS LIST

1 automatic inspection system
2 inspection target object
10 wireless slave device
11 sound collection unit
12 analysis unit
13 wireless communication unit
14 power supply unit
15 learning result
16 feature extraction unit
17 abnormality-degree and sound-state-information calculation unit
20 wireless relay
21 wireless communication unit
30 wireless master device
31 wireless communication unit
32 data storage unit
33 data disclosure unit
321 abnormality degree
322 abnormality cause
323 sound state information
324 other information
40 monitoring terminal
41 abnormality degree trend
42 abnormality cause
58 built-in battery

The invention claimed is:

1. An automatic inspection system comprising:
a wireless slave device; and
a wireless master device,
wherein the wireless slave device includes:
a sound collection unit that collects sound generated from an inspection target object,
an analysis unit that randomly samples a set of features of the collected sound and features of normal sound learned in advance and obtains a degree of difference based on a difference of the set of features, and obtains sound state information of the collected sound, which is an associated frequency band having an influence on the degree of difference and a magnitude of the associated frequency band, as an analysis result,
a wireless communication unit that wirelessly transmits data including the analysis result which includes the degree of difference and the sound state information, to the wireless master device, and
a power supply unit that supplies power to the sound collection unit, the analysis unit, and the wireless communication unit, and
wherein the wireless master device is configured to perform processing of receiving and managing the data from the wireless slave device, and transmitting the analysis result extracted from the data to a monitoring terminal that monitors a state of the inspection target object.

2. The automatic inspection system according to claim 1, wherein the analysis unit includes:

a learning result of sound of the inspection target object that normally operates, and an abnormality-degree and sound-state-information calculation unit that calculates the degree of difference between the set of features of the collected sound and the set of features of the learning result.

3. The automatic inspection system according to claim 2, wherein, in a case where the wireless master device determines that the collected sound is abnormal, based on the analysis result extracted from the data, the wireless master device specifies an abnormality cause from the sound state information and transmits the abnormality cause to the monitoring terminal.

4. The automatic inspection system according to claim 3, wherein the abnormality-degree and sound-state-information calculation unit calculates an average value of an abnormality degree of the inspection target object based on the degree of difference over a period of time and positive and negative standard deviations for the average value of the abnormality degree based on the degree of difference over the period of time.

5. The automatic inspection system according to claim 4, wherein in a case where both the average value of the abnormality degree and the standard deviation of the abnormality degree, which have been obtained from the analysis result, are high over a predetermined period, the wireless master device notifies the monitoring terminal that an abnormality has occurred in the inspection target object.

6. The automatic inspection system according to claim 5, wherein the wireless master device:

determines that the analysis unit erroneously detects an abnormality of the inspection target object in a case where the average value and the standard deviation of the abnormality degree are equal to or greater than a predetermined value, determines that the analysis unit correctly detects the abnormality of the inspection target object in a case where the average value of the abnormality degree is equal to or greater than the predetermined value and the standard deviation of the abnormality degree is smaller than the predetermined value, and notifies the monitoring terminal that an abnormality has occurred in the inspection target object in a case where the wireless master device determines that the analysis unit correctly detects the abnormality of the inspection target object.

7. The automatic inspection system according to claim 1, wherein the sound collection unit outputs a digital signal of the sound collected from the inspection target object, and wherein the wireless communication unit adds destination information of the wireless master device to the analysis result obtained by the analysis unit, and wirelessly transmits the analysis result to the wireless master device at a predetermined timing.

8. The automatic inspection system according to claim 1, wherein the wireless slave device includes a built-in battery, and wherein the power supply unit performs control to supply power of the built-in battery to the sound collection unit, the analysis unit, and the wireless communication unit.

9. The automatic inspection system according to claim 1, wherein the wireless slave device includes a temperature sensor that measures a temperature of the inspection target object, and the wireless communication unit wirelessly transmits data including the analysis result and the temperature measured by the temperature sensor to the wireless master device.

10. The automatic inspection system according to claim 1, further comprising:

a wireless relay that is disposed between the wireless slave device and the wireless master device that issues an instruction of a transmission order of data including the analysis result for a plurality of the wireless slave devices, and wirelessly transmits, to the wireless master device, the data received from the wireless slave device in accordance with the transmission order.

11. The automatic inspection system according to claim 10, wherein in a case where one of a plurality of the wireless slave devices detects that transmission of the data including the analysis result to one wireless relay is not possible, wherein the one wireless slave device requests another wireless slave device capable of transmitting data to another wireless relay, to transfer the data including the analysis result, and wherein the other wireless slave device transfers the data including the analysis result transmitted from the one wireless slave device, to the one wireless relay.

12. The automatic inspection system according to claim 1, wherein in a case where one of a plurality of the wireless slave devices detects that transmission of the data including the analysis result to one wireless master device is not possible, wherein the one wireless slave device requests another wireless slave device capable of transmitting data to the wireless master device, to transfer the data including the analysis result, and wherein the other wireless slave device transfers the data including the analysis result transmitted from the one wireless slave device, to the wireless master device.

13. A wireless slave device comprising:

a sound collection unit that collects sound generated from an inspection target object;

an analysis unit that randomly samples a set of features of the collected sound and features of normal sound learned in advance and obtains a degree of difference based on a difference of the set of features, and obtains sound state information of the collected sound, which is an associated frequency band having an influence on the degree of difference and a magnitude of the associated frequency band, as an analysis result;

a wireless communication unit that wirelessly transmits data including the analysis result, which includes the degree of difference and the sound state information, to a wireless master device that manages the data; and a power supply unit that supplies power to the sound collection unit, the analysis unit, and the wireless communication unit.

* * * * *